US012081774B2

(12) United States Patent
Lee et al.

(10) Patent No.: US 12,081,774 B2
(45) Date of Patent: Sep. 3, 2024

(54) IMAGE ENCODING/DECODING METHOD AND APPARATUS, AND RECORDING MEDIUM HAVING STORED BITSTREAM THEREON

(71) Applicants: Electronics and Telecommunications Research Institute, Daejeon (KR); INDUSTRY-UNIVERSITY COOPERATION FOUNDATION KOREA AEROSPACE UNIVERSITY, Goyang-si (KR)

(72) Inventors: Jin Ho Lee, Daejeon (KR); Jung Won Kang, Daejeon (KR); Ha Hyun Lee, Daejeon (KR); Sung Chang Lim, Daejeon (KR); Hui Yong Kim, Daejeon (KR); Jae Gon Kim, Goyang-si (KR); Do Hyeon Park, Goyang-si (KR); Ji Hoon Do, Busan (KR); Yong Uk Yoon, Jeju-si (KR)

(73) Assignees: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY KOREA, Goyang-si (KR)

( * ) Notice: Subject to any disclaimer, the term of this patent is extended or adjusted under 35 U.S.C. 154(b) by 284 days.

(21) Appl. No.: 17/614,935

(22) PCT Filed: May 29, 2020

(86) PCT No.: PCT/KR2020/006970
§ 371 (c)(1),
(2) Date: Nov. 29, 2021

(87) PCT Pub. No.: WO2020/242238
PCT Pub. Date: Dec. 3, 2020

(65) Prior Publication Data
US 2022/0232230 A1    Jul. 21, 2022

(30) Foreign Application Priority Data
May 29, 2019    (KR) .................... 10-2019-0063272

(51) Int. Cl.
*H04N 19/176*    (2014.01)
*H04N 19/119*    (2014.01)
(Continued)

(52) U.S. Cl.
CPC ......... *H04N 19/176* (2014.11); *H04N 19/119* (2014.11); *H04N 19/18* (2014.11); *H04N 19/50* (2014.11)

(58) Field of Classification Search
CPC .... H04N 19/176; H04N 19/119; H04N 19/18; H04N 19/50
See application file for complete search history.

(56) References Cited

U.S. PATENT DOCUMENTS 9,432,696 B2    8/2016    Chong et al.
10,306,230 B2   5/2019    Kim et al.
(Continued)

FOREIGN PATENT DOCUMENTS

JP    2013012947 A    1/2013
KR    101477621 B1    1/2015
(Continued)

*Primary Examiner* — Jae N Noh
(74) *Attorney, Agent, or Firm* — Sughrue Mion, PLLC

(57) ABSTRACT

Disclosed herein is a video decoding method including determining a zero-out width threshold and a zero-out height threshold for distinguishing between a transform coefficient coding region and a zero-out region of a current block according to a size of the current block, determining the transform coefficient coding region and the zero-out region (Continued)

of the current block according to the zero-out width threshold and the zero-out height threshold, acquiring transform coefficient information of the transform coefficient coding region from a bitstream and determining a level of a transform coefficient of the transform coefficient coding region according to the transform coefficient information, determining a level of a transform coefficient of the zero-out region as 0 without acquiring transform coefficient information, and reconstructing the current block by inversely transforming the transform coefficient of the current block.

18 Claims, 24 Drawing Sheets

(51) Int. Cl.
　　　*H04N 19/18*　　　(2014.01)
　　　*H04N 19/50*　　　(2014.01)

(56) References Cited

U.S. PATENT DOCUMENTS

| | | |
|---|---|---|
| 2008/0232465 A1 | 9/2008 | Zhang |
| 2015/0264403 A1 | 9/2015 | Chong et al. |
| 2020/0296403 A1 | 9/2020 | Han et al. |
| 2021/0037243 A1* | 2/2021 | Abe .................... H04N 19/119 |
| 2021/0127112 A1* | 4/2021 | Choi .................... H04N 19/12 |

FOREIGN PATENT DOCUMENTS

| | | |
|---|---|---|
| KR | 1020160134702 A | 11/2016 |
| KR | 1020170142870 A | 12/2017 |

\* cited by examiner

FIG. 15

| TRANSFORM COEFFICIENT GROUP 0 (4x4) | TRANSFORM COEFFICIENT GROUP 1 | TRANSFORM COEFFICIENT GROUP 2 | TRANSFORM COEFFICIENT GROUP 3 |
|---|---|---|---|
| TRANSFORM COEFFICIENT GROUP 4 | TRANSFORM COEFFICIENT GROUP 5 | TRANSFORM COEFFICIENT GROUP 6 | TRANSFORM COEFFICIENT GROUP 7 |
| TRANSFORM COEFFICIENT GROUP 8 | TRANSFORM COEFFICIENT GROUP 9 | TRANSFORM COEFFICIENT GROUP 10 | TRANSFORM COEFFICIENT GROUP 11 |
| TRANSFORM COEFFICIENT GROUP 12 | TRANSFORM COEFFICIENT GROUP 13 | TRANSFORM COEFFICIENT GROUP 14 | TRANSFORM COEFFICIENT GROUP 15 |

FIG.16

TRANSFORM COEFFICIENT GROUP 0 (5x5) ......

FIG. 17
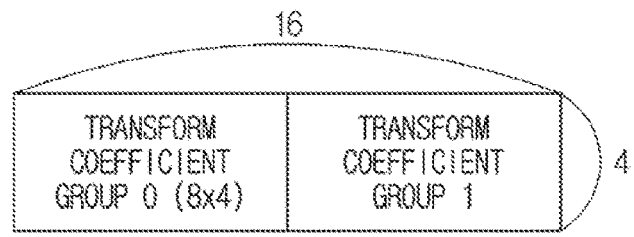
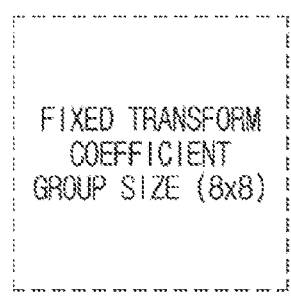
FIG. 18
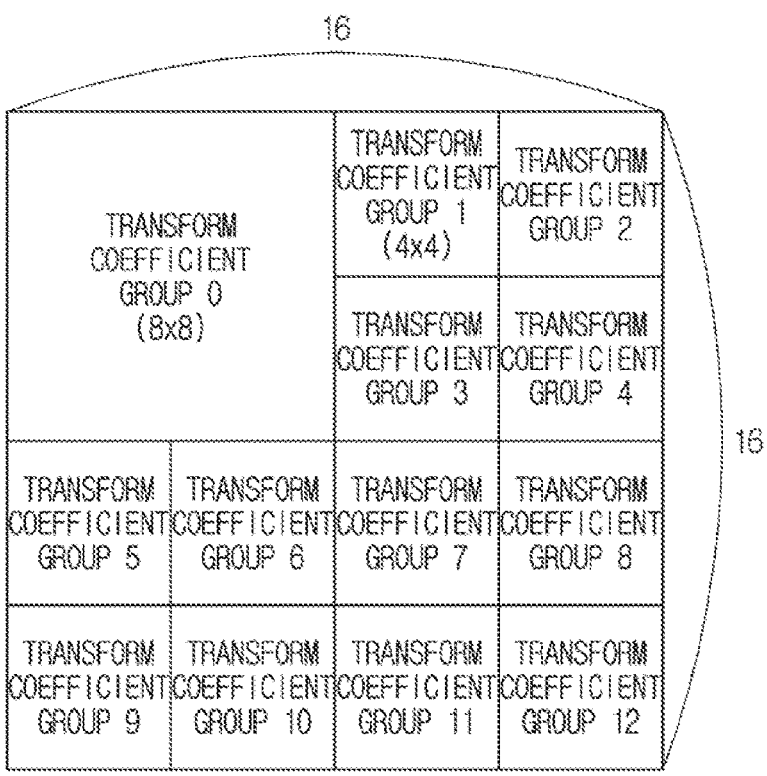

FIG. 34
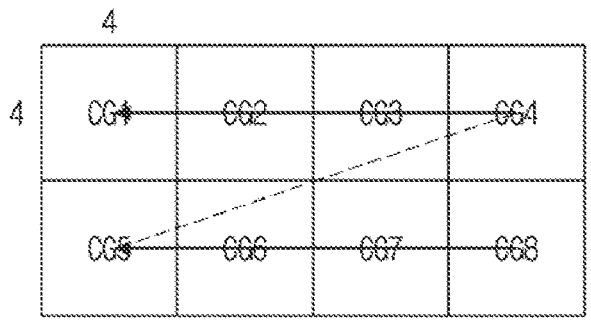
FIG. 35
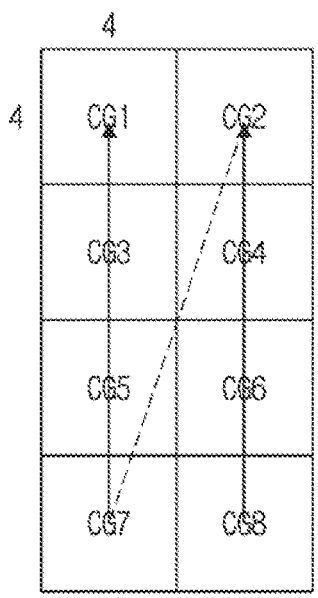
FIG. 36
TRANSFORM COEFFICIENT | TRANSFORM COEFFICIENT UNIT SIGNIFICANT COEFFICIENT FLAG | TRANSFORM COEFFICIENT BLOCK UNIT SIGNIFICANT COEFFICIENT GROUP FLAG

IMAGE ENCODING/DECODING METHOD AND APPARATUS, AND RECORDING MEDIUM HAVING STORED BITSTREAM THEREON

TECHNICAL FIELD

The present disclosure relates to an image encoding/decoding method and apparatus, and a recording medium for storing a bitstream.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present disclosure is to provide an image encoding/decoding method and apparatus with improved encoding/decoding efficiency.

Another object of the present disclosure is to provide a recording medium for storing a bitstream generated by an image decoding method or apparatus according to the present disclosure.

Technical Solution

In the present disclosure, provided is a video decoding method including determining a transform coefficient coding region and a zero-out region of a current block according to a size of the current block, acquiring transform coefficient information of the transform coefficient coding region from a bitstream and determining a level of a transform coefficient of the transform coefficient coding region according to the transform coefficient information, determining a level of a transform coefficient of the zero-out region as 0 without acquiring the transform coefficient information, and reconstructing the current block using the transform coefficient of the current block.

According to one embodiment, the video decoding method further include determining a zero-out width threshold and a zero-out height threshold for distinguishing between the transform coefficient coding region and the zero-out region, and the determining of the transform coefficient coding region and the zero-out region may include determining the transform coefficient coding region and the zero-out region according to the zero-out width threshold and the zero-out height threshold.

According to one embodiment, the determining of the transform coefficient coding region and the zero-out region may include including a transform coefficient corresponding an x-coordinate greater than the zero-out width threshold in the zero-out region, including a transform coefficient corresponding a y-coordinate greater than the zero-out height threshold in the zero-out region, and including a transform coefficient corresponding an x-coordinate equal to or less than the zero-out width threshold or a y-coordinate equal to or less than the zero-out height threshold in the transform coefficient coding region.

According to one embodiment, the determining of the zero-out width threshold and the zero-out height threshold may include determining the zero-out width threshold and the zero-out height threshold according to the larger value of the height and width of the current block.

According to one embodiment, the determining of the zero-out width threshold and the zero-out height threshold may include determining the zero-out width threshold and the zero-out height threshold as 16, when the larger value of the height and width of the current block is equal to or less than 32, and determining the zero-out width threshold and the zero-out height threshold as 32, when the larger value of the height and width of the current block is equal to or greater than 64.

According to one embodiment, the determining of the zero-out width threshold and the zero-out height threshold may include determining the zero-out width threshold as 16, when the height of the current block is less than 64 and the width of the current block is 32, determining the zero-out width threshold as the smaller value of the width of the current block and 32, when the height of the current block is equal to or greater than 64 or the width of the current block is not 32, determining the zero-out height threshold as 16, when the height of the current block is 32 and the width of the current block is less than 64, and determining the zero-out height threshold as the smaller value of the height of the current block and 32, when the height of the current block is not 32 or the width of the current block is equal to or greater than 64.

According to one embodiment, the determining of the transform coefficient coding region and the zero-out region may include determining the current block not to include the zero-out region, when the size of the current block is equal to or less than a first reference size.

According to one embodiment, the first reference size may be 16×16.

According to one embodiment, the determining of the transform coefficient coding region and the zero-out region may include determining the transform coefficient coding region of the current block according to the second reference size and determining the zero-out region as a region obtained by excluding the transform coefficient coding region from the current block, when the size of the current block is greater than a second reference size.

According to one embodiment, the first reference size may be 32×32.

According to one embodiment, the reconstructing of the current block by inversely transforming the transform coefficient of the current block may include performing secondary inverse transform with respect to the transform coefficient of the current block, when the current block is intra predicted, and performing primary inverse transform with respect to the transform coefficient subjected to secondary inverse transform.

According to one embodiment, the performing of secondary inverse transform with respect to the transform coefficient of the current block may include determining a low frequency region of the current block according to the size of the current block, and scanning a predetermined number of transform coefficients of the low frequency region and performing secondary inverse transform with respect to the scanned transform coefficients.

According to one embodiment, the performing of secondary inverse transform with respect to the transform coefficient of the current block may include acquiring a secondary transform index indicating a secondary inverse transform matrix used for secondary inverse transform from a bitstream, and determining the secondary inverse transform matrix according to at least one of an intra prediction mode of the current block or the secondary transform index.

In the present disclosure, provided is a video encoding method including acquiring a transform coefficient of a current block by encoding the current block, determining a transform coefficient coding region and a zero-out region of the current block according to a size of the current block, determining transform coefficient information of the current block according to a level of a transform coefficient of the transform coefficient coding region, and outputting a bitstream including transform coefficient information of the current block, wherein transform coefficient information of a transform coefficient of the zero-out region is omitted.

According to one embodiment, the video encoding method may further include determining a zero-out width threshold and a zero-out height threshold for distinguishing between the transform coefficient coding region and the zero-out region, and the determining of the transform coefficient coding region and the zero-out region may include determining the transform coefficient coding region and the zero-out region according to the zero-out width threshold and the zero-out height threshold.

According to one embodiment, the determining of the transform coefficient coding region and the zero-out region may include including a transform coefficient corresponding an x-coordinate greater than the zero-out width threshold in the zero-out region, including a transform coefficient corresponding a y-coordinate greater than the zero-out height threshold in the zero-out region, and including a transform coefficient corresponding an x-coordinate equal to or less than the zero-out width threshold or a y-coordinate equal to or less than the zero-out height threshold in the transform coefficient coding region.

According to one embodiment, the determining of the zero-out width threshold and the zero-out height threshold may include determining the zero-out width threshold and the zero-out height threshold according to the larger value of the height and width of the current block.

According to one embodiment, the determining of the zero-out width threshold and the zero-out height threshold may include determining the zero-out width threshold and the zero-out height threshold as 16, when the larger value of the height and width of the current block is equal to or less than 32, and determining the zero-out width threshold and the zero-out height threshold as 32, when the larger value of the height and width of the current block is equal to or greater than 64.

According to one embodiment, the determining of the zero-out width threshold and the zero-out height threshold may include determining the zero-out width threshold as 16, when the height of the current block is less than 64 and the width of the current block is 32, determining the zero-out width threshold as the smaller value of the width of the current block and 32, when the height of the current block is equal to or greater than 64 or the width of the current block is not 32, determining the zero-out height threshold as 16, when the height of the current block is 32 and the width of the current block is less than 64, and determining the zero-out height threshold as the smaller value of the height of the current block and 32, when the height of the current block is not 32 or the width of the current block is equal to or greater than 64.

According to one embodiment, the determining of the transform coefficient coding region and the zero-out region may include determining the current block not to include the zero-out region, when the size of the current block is equal to or less than a first reference size.

According to one embodiment, the first reference size may be 16×16.

According to one embodiment, the determining of the transform coefficient coding region and the zero-out region may include determining the transform coefficient coding region of the current block according to the second reference size and determining the zero-out region as a region obtained by excluding the transform coefficient coding region from the current block, when the size of the current block is greater than a second reference size.

According to one embodiment, the first reference size may be 32×32.

According to one embodiment, the acquiring of the transform coefficient of the current block may include performing primary transform with respect to a residual sample of the current block to generate a transform coefficient, and performing secondary transform with respect to the generated transform coefficient, when the current block is intra predicted.

According to one embodiment, the performing of secondary inverse transform with respect to the transform coefficient of the current block may include determining a low frequency region of the current block according to the size of the current block, and scanning a transform coefficient of the low frequency region and performing secondary inverse transform with respect to the scanned transform coefficient.

According to one embodiment, the performing of secondary inverse transform with respect to the transform coefficient of the current block may include determining the secondary inverse transform matrix according to at least one of an intra prediction mode of the current block or the secondary transform index.

In the present disclosure, there is provided a non-transitory computer-readable recoding medium including a bitstream in which a video is encoded, wherein the bitstream includes transform coefficient information of a current block, wherein the current block is partitioned into a transform coefficient coding region and a zero-out region according to a zero-out width threshold and a zero-out height threshold, wherein the zero-out width threshold and the zero-out height threshold are determined according to a size of the current block, wherein a level of a transform coefficient of the transform coefficient coding region is determined according to the transform coefficient information, wherein the level of the transform coefficient of the zero-out region is determined as 0 without acquiring the transform coefficient information, and wherein the current block is reconstructed according to transform coefficients of the transform coefficient coding region and the zero-out region.

In the present disclosure, provided is a video decoding method including determining a palette constructed in colors applied to a current block when the current block is encoded according to a palette mode, partitioning the current block into one or more sample information groups according to at least one of a size of the current block or a scan method, acquiring palette index information indicating colors used for samples of the sample information groups from among the colors of the palette in sample information group units, and reconstructing the sample information groups according to palette index information.

According to one embodiment, the partitioning of the current block into one or more sample information groups may include determining the number of sample information groups according to the size of the current block, and partitioning the current block such that the current block includes the determined number of sample information groups.

According to one embodiment, the determining of the number of sample information groups may include determining the number of sample information groups of the current block such that 16 samples are included in each of the sample information groups.

According to one embodiment, the partitioning of the current block into one or more sample information groups may include determining a size of the sample information groups according to a scan method of the current block, and partitioning the current block according to the size of the determined number of sample information groups.

According to one embodiment, the determining of the size of the sample information groups according to the scan method of the current block may include determining a width of the sample information groups to be equal to a width of the current block and a height of the sample information groups to be equal to a value obtained by dividing a height of the current block by the number of sample information groups, when the current block is scanned according to a horizontal scan method, and determining the height of the sample information groups to be equal to the height of the current block and the width of the sample information groups to be equal to a value obtained by dividing the width of the current block by the number of sample information groups, when the current block is scanned according to a vertical scan method.

In the present disclosure, provided is a video encoding method including generating a palette constructed in colors used for a current block when a palette mode is applied to the current block, partitioning the current block into one or more sample information groups according to at least one of a size of the current block or a scan method, generating palette index information indicating colors used for samples of the sample information groups from among the colors of the palette in sample information group units, and outputting a bitstream including the palette index information.

According to one embodiment, the partitioning of the current block into one or more sample information groups may include determining the number of sample information groups according to the size of the current block, and partitioning the current block such that the current block includes the determined number of sample information groups.

According to one embodiment, the determining of the number of sample information groups may include determining the number of sample information groups of the current block such that 16 samples are included in each of the sample information groups.

According to one embodiment, the partitioning of the current block into one or more sample information groups may include determining a size of the sample information groups according to a scan method of the current block, and partitioning the current block according to the size of the determined number of sample information groups.

According to one embodiment, the determining of the size of the sample information groups according to the scan method of the current block may include determining a width of the sample information groups to be equal to a width of the current block and a height of the sample information groups to be equal to a value obtained by dividing a height of the current block by the number of sample information groups, when the current block is scanned according to a horizontal scan method, and determining the height of the sample information groups to be equal to the height of the current block and the width of the sample information groups to be equal to a value obtained by dividing the width of the current block by the number of sample information groups, when the current block is scanned according to a vertical scan method.

Advantageous Effects

According to the present disclosure, it is possible to provide an image encoding/decoding method and apparatus with improved compression efficiency.

According to the present disclosure, it is possible to improve encoding efficiency using an efficient sample information grouping method, scanning method and binarization method.

DESCRIPTION OF DRAWINGS

FIG. 15 is a view showing an embodiment in which a current block includes a plurality of transform coefficient groups.

FIG. 16 is a view showing an embodiment in which a current block includes a plurality of transform coefficient groups.

FIG. 17 is a view showing an embodiment in which a current block includes one or more transform coefficient groups when a default height and/or default width of a transform coefficient group is greater than those of a current block.

FIGS. 18 to 20 are views showing an embodiment of variable-size transform coefficient grouping.

FIG. 28 is a view showing a scanning order according to horizontal scanning.

FIG. 29 is a view showing a scanning order according to vertical scanning.

FIG. 34 is a view showing an embodiment of a scanning method of a transform coefficient group of a current block having a horizontal non-square shape.

FIG. 35 is a view showing an embodiment of a scanning method of a transform coefficient group of a current block having a vertical non-square shape.

FIG. 36 is a view showing a significant coefficient flag and significant coefficient group flag of a current block including a transform coefficient group.

BEST MODE

Figure 1:
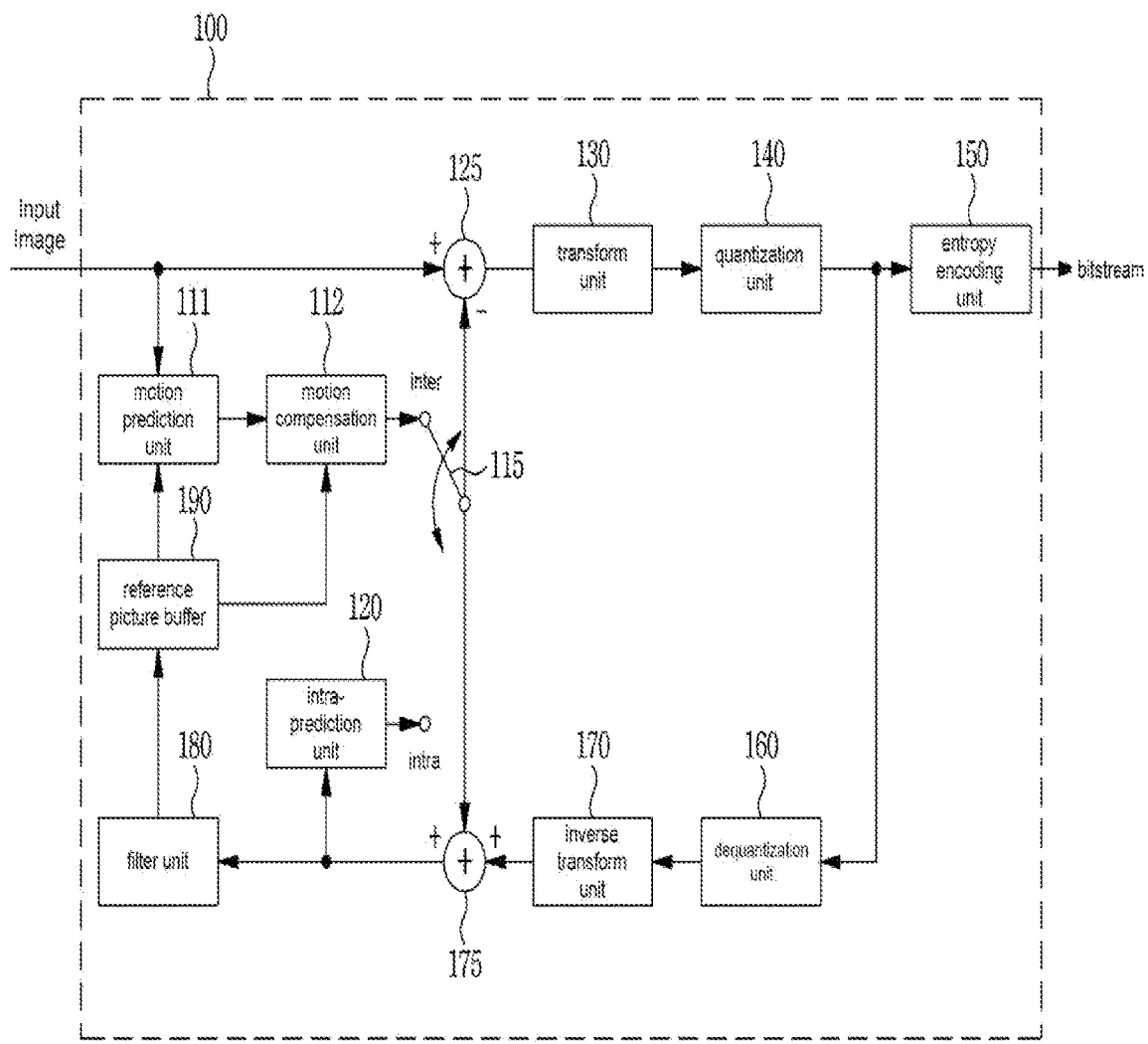
FIG. 1 is a block diagram showing a configuration of an encoding apparatus according to an embodiment to which the present disclosure is applied.

In the present disclosure, provided is a video decoding method including determining a transform coefficient coding region and a zero-out region of a current block according to a size of the current block, acquiring transform coefficient information of the transform coefficient coding region from a bitstream and determining a level of a transform coefficient of the transform coefficient coding region according to the transform coefficient information, determining a level of a transform coefficient of the zero-out region as 0 without acquiring the transform coefficient information, and reconstructing the current block using the transform coefficient of the current block.

MODE FOR INVENTION

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present disclosure, references are made to the accompanying drawings that show, by way of illustration, specific embodiments in which the invention may be practiced. These embodiments are described in sufficient detail to enable those skilled in the art to implement the present disclosure. Various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, when an element is referred to as being "directly coupled" or "directly connected" to another element, there are no intervening elements present.

Furthermore, constitutional parts shown in the embodiments of the present disclosure are independently shown to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present disclosure, if not departing from the essence of the present disclosure.

The terms used in the present specification are merely used to describe particular embodiments, and are not intended to limit the present disclosure. An expression used in the singular encompasses the expression of the plural unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present disclosure or the scope of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element, and attribute, etc. may have a value. A value of information, data, flag, index, element, and attribute equal to "0" may represent a logical false or the first predefined value. In other words, a value "0", a false, a logical false and the first predefined value may be replaced with each other. A value of information, data, flag, index, element, and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present disclosure, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, a Cb coding tree block, and a Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block, or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present disclosure is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both.

In addition, encoding apparatus 100 may generate a bitstream including encoded information through encoding the input image, and output the generated bitstream. The generated bitstream may be stored in a computer readable recording medium or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block, or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
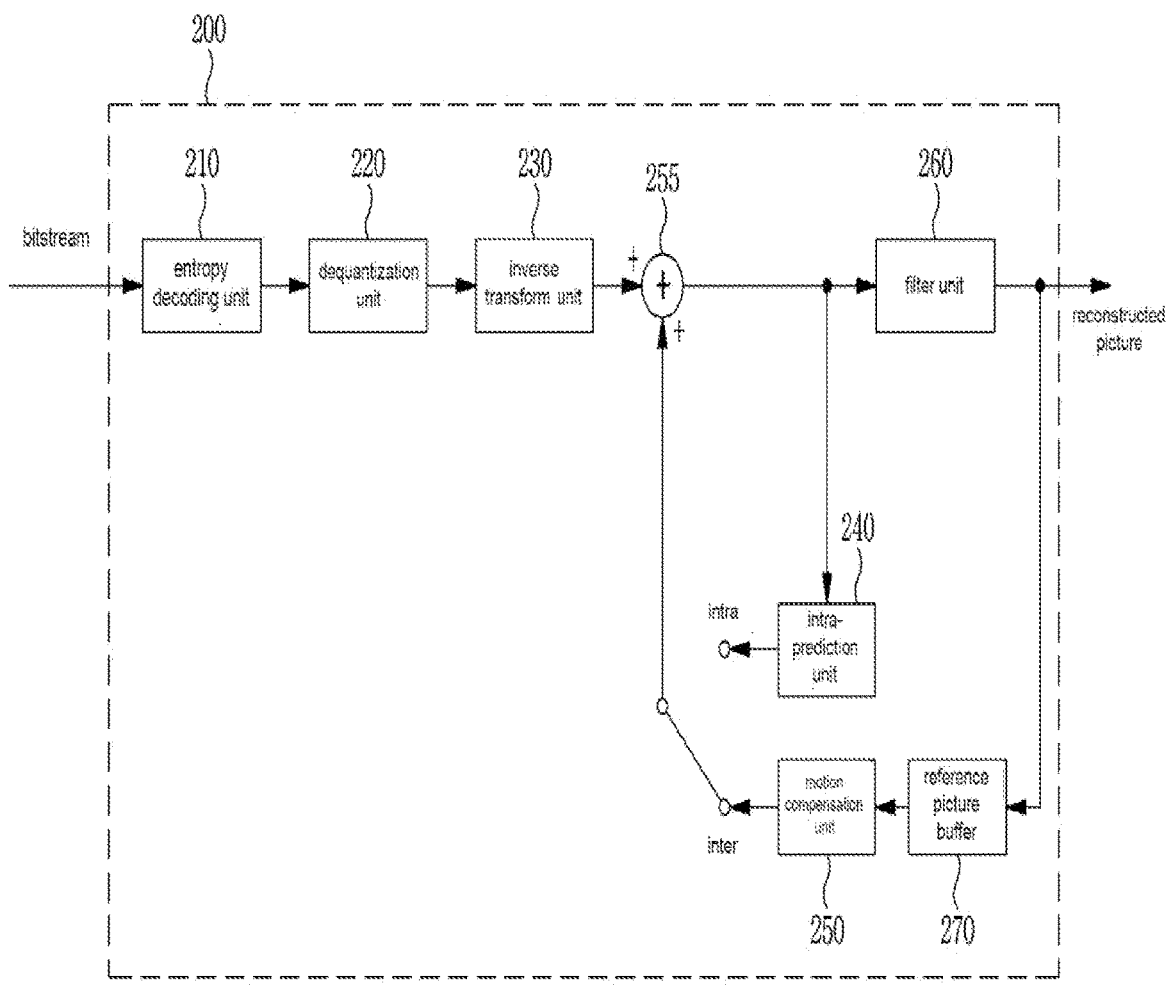
FIG. 2 is a block diagram showing a configuration of a decoding apparatus according to an embodiment and to which the present disclosure is applied.

FIG. 2 is a block diagram showing a configuration of a decoding apparatus according to an embodiment and to which the present disclosure is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
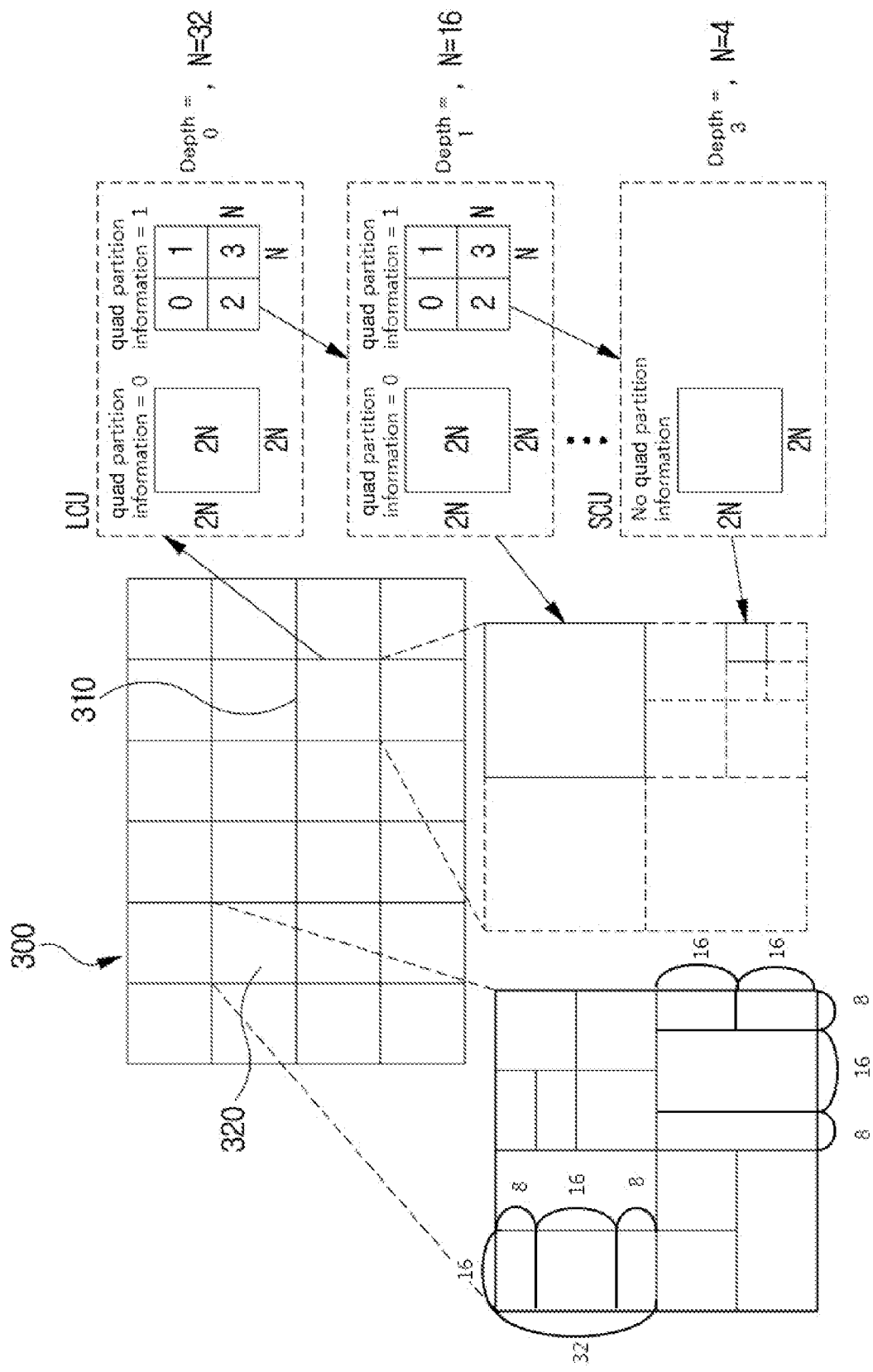
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size, and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding unit that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced as a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced as a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be deduced as a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced as a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced as a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be deduced as a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
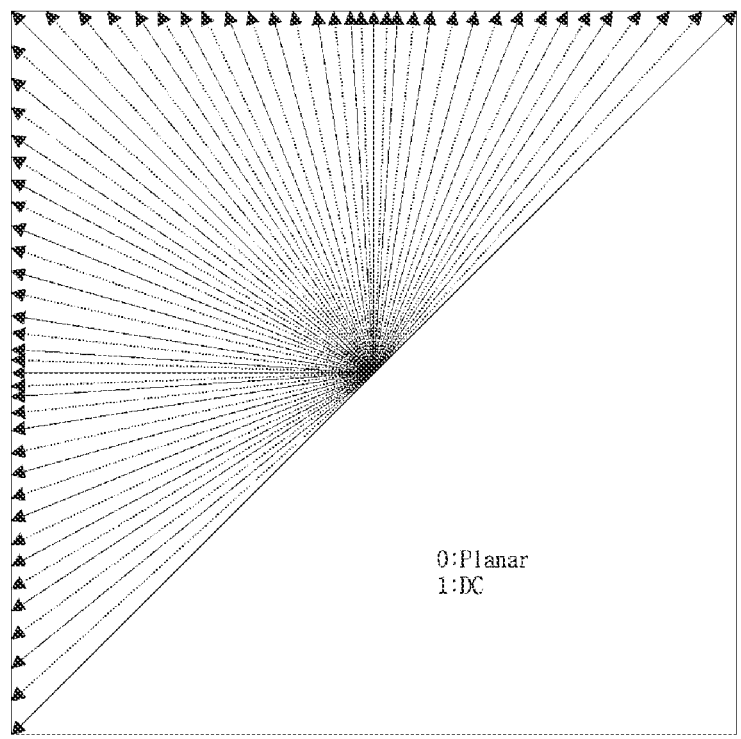
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
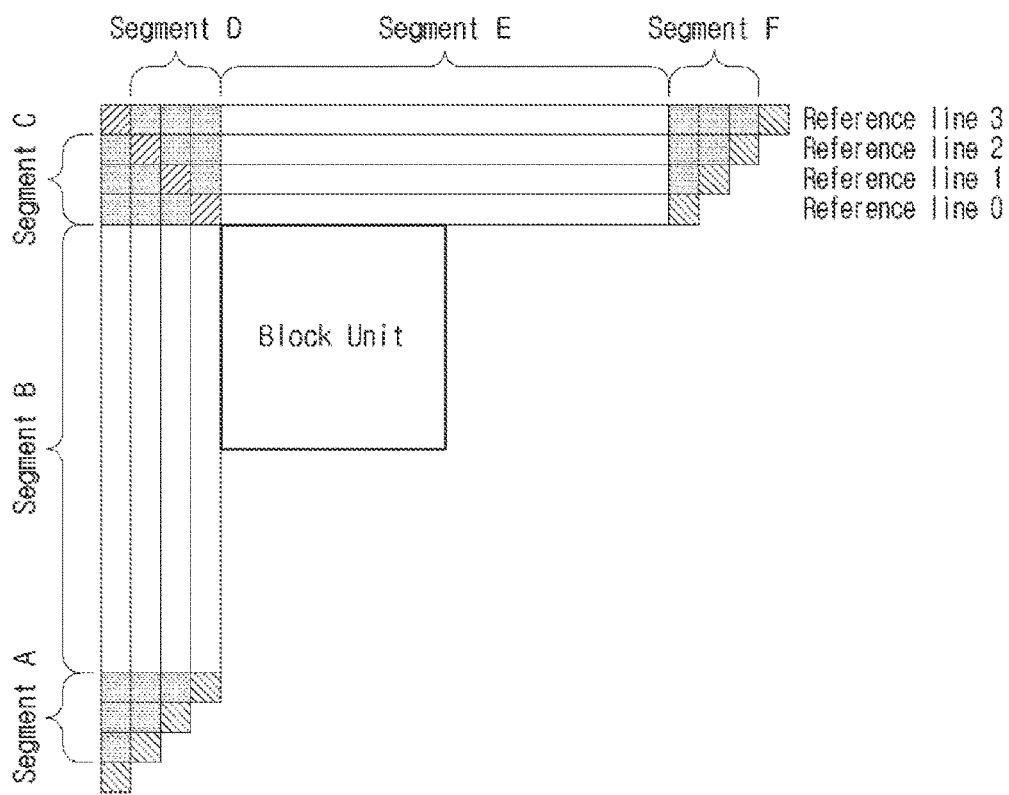
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
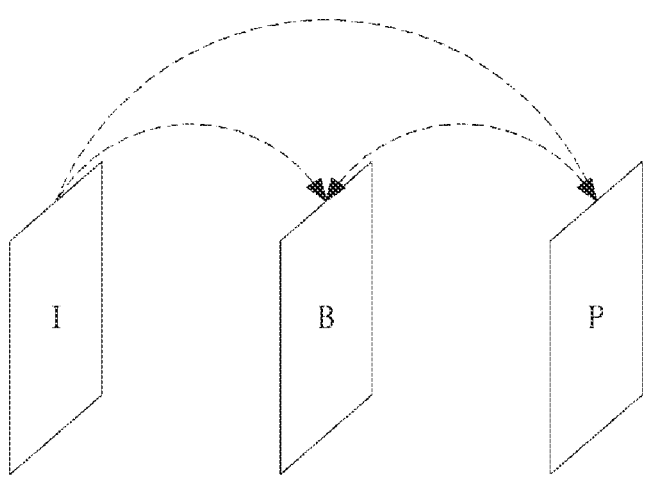
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
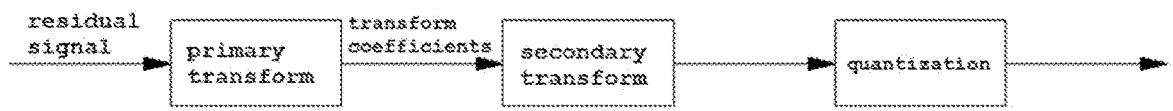
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

According to an embodiment, embodiments of a sample information grouping method, a sample information scanning method, and a sample information binarization method of the present disclosure are applicable to sample information of a current block. The sample information refers to information on a sample value included in the current block. The sample information may include at least one of an original sample, a predicted sample, a reconstructed sample, a residual sample, a luma sample, a chroma sample or a transform coefficient of the current block. Accordingly, hereinafter, the sample information grouping method, the sample information scanning method, and the sample information binarization method are applicable to grouping and scanning of a transform coefficient.

The sample information grouping method, the sample information scanning method, and the sample information binarization method of the present disclosure indicate a sample information grouping method, a sample information scanning method, and a sample information binarization method applied to a transform coefficient. The sample information grouping method, the sample information scanning method and the sample information binarization method of the present disclosure are applicable to lossless coding according to a palette mode, a PCM mode and a transform skip mode as well as lossy coding according to transform and quantization.

Figure 8:
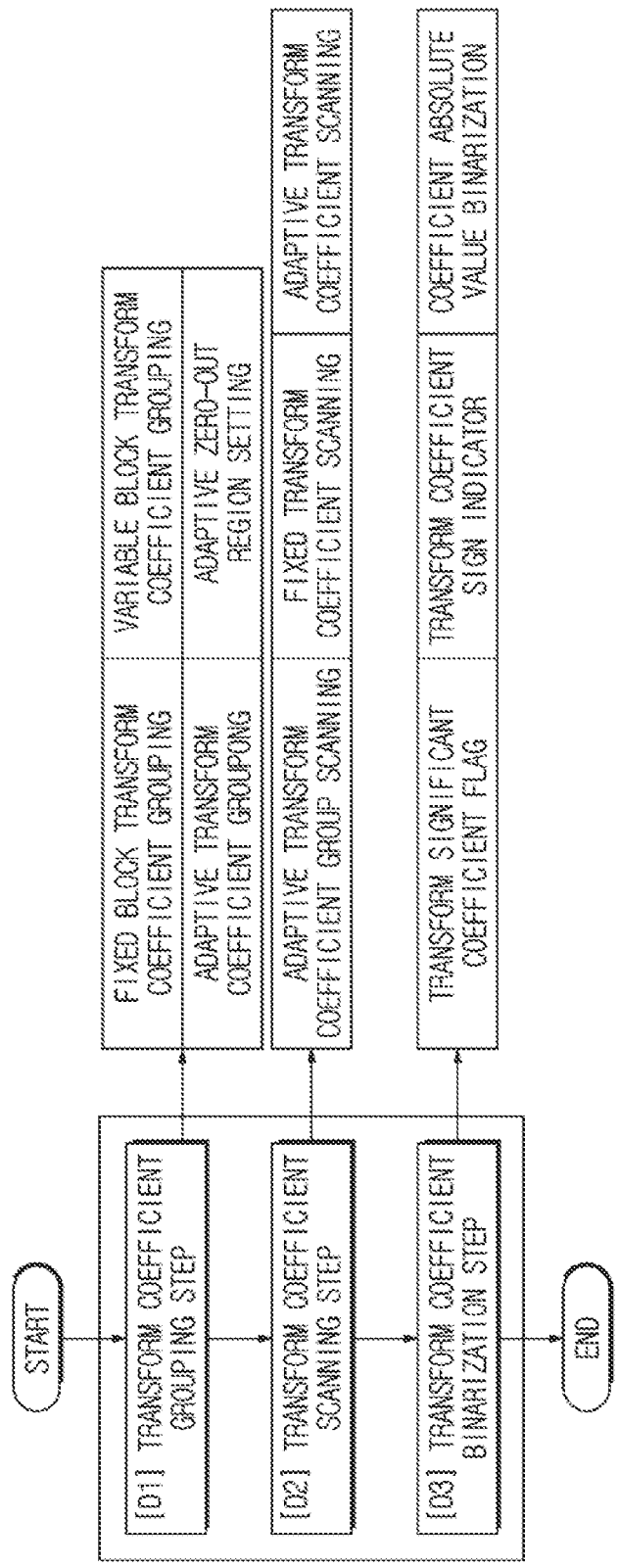
FIG. 8 is a view showing the configuration of a transform coefficient encoding/decoding method and apparatus related to the present disclosure.

FIG. 8 is a view showing the configuration of a transform coefficient encoding/decoding method and apparatus related to the present disclosure. Hereinafter, transform coefficient encoding/decoding will be described with reference to FIG. 8.

In performing transform coefficient encoding/decoding, transform coefficient encoding/decoding may be performed in transform block units. The transform block may mean a block in which at least one of quantization/dequantization, transform/inverse transform or secondary transform/inverse secondary transform is performed.

For example, the transform block may be a coding block (CU; coding unit). Alternatively, the transform block may be a sub transform block (sub-CU; sub coding unit) in which prediction is performed by partitioning the CU. For example, the transform block may be a sub coding block partitioned in an intra sub-partitioning (ISP) mode. In ISP mode, the coding block may be partitioned into two or four sub coding blocks vertically or horizontally and each sub coding block may be independently intra predicted.

The current block of the claims may mean a transform block in which transform coefficient encoding/decoding is performed. The transform block may include a first transform coefficient according to primary transform and a second transform coefficient according to secondary transform.

Figure 9:
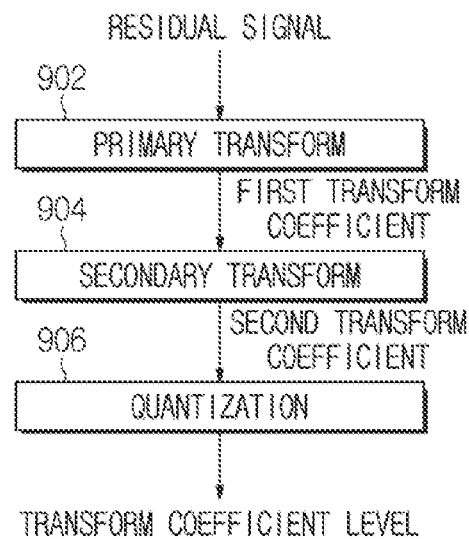
FIGS. 9 and 10 are views showing embodiments of transform coding of an encoder.
Figure 10:
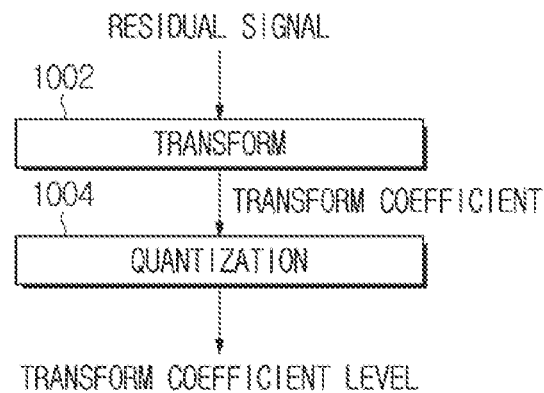

FIGS. 9 and 10 are views showing embodiments of transform coding of an encoder.

In FIG. 9, transform coding of the current block is performed twice.

In step 902, primary transform is performed with respect to a residual signal of the current block. Accordingly, a first transform coefficient obtained by performing primary transform with respect to the residual signal is generated.

In step 904, secondary transform is performed with respect to the first transform coefficient of the current block. Accordingly, a second transform coefficient obtained by performing secondary transform with respect to the first transform coefficient is generated.

In step 906, the second transform coefficient is quantized according to a quantization parameter. Accordingly, level information of the quantized second transform coefficient is generated.

The embodiments of the transform methods described in FIG. 6 are applicable to the first transform and second transform described in steps 902 and 904 of FIG. 9.

In FIG. 10, transform coding of the current block is performed once.

In step 1002, transform is performed with respect to a residual signal of the current block. Accordingly, a transform coefficient obtained by performing transform with respect to the residual signal is generated.

In step 1004, the transform coefficient is quantized according to a quantization parameter. Accordingly, level information of the quantized transform coefficient is generated.

The embodiments of the transform method described in FIG. 6 are applicable to the transform described in step 1002 of FIG. 10.

According to an embodiment, the encoder may adaptively select the transform coding of FIG. 9 and the transform coding of FIG. 10 with respect to the current block. Alternatively, only one of the transform coding of FIG. 9 and the transform coding of FIG. 10 is applicable to the encoder.

Figure 11:
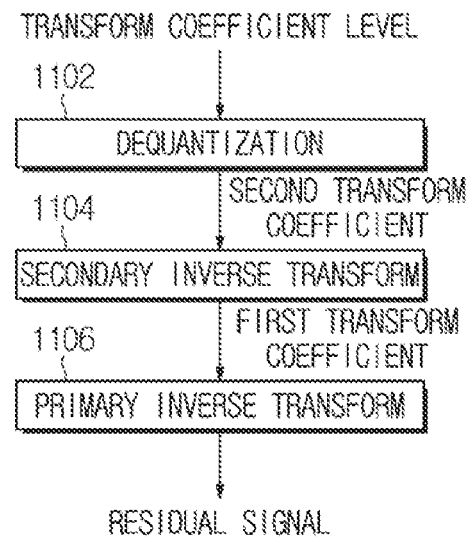
FIGS. 11 and 12 are views showing embodiments of transform coding of a decoder.
Figure 12:
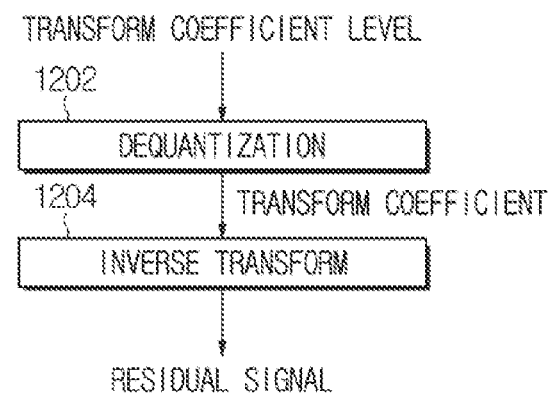

FIGS. 11 and 12 are views showing embodiments of transform coding of a decoder.

In FIG. 11, transform coding of a current block is performed twice.

In step 1102, dequantization is performed with respect to level information of a transform coefficient of the current block. Accordingly, a second transform coefficient generated by performing transform with respect to a residual signal of the current block twice in an encoder is reconstructed.

In step 1104, secondary inverse transform is performed with respect to a second transform coefficient of the current block. Accordingly, a first transform coefficient generated by performing transform with respect to the residual signal of the current block once in the encoder is reconstructed.

In step 1106, primary inverse transform is performed with respect to the first transform coefficient of the current block. Accordingly, the residual signal of the current block is reconstructed from the first transform coefficient.

In FIG. 12, transform coding of the current block is performed once.

In step 1202, dequantization is performed with respect to the level information of the transform coefficient of the current block. Accordingly, a transform coefficient generated by performing transform with respect to the residual signal of the current block is reconstructed.

In step 1204, inverse transform is performed with respect to the transform coefficient of the current block. Accordingly, the residual signal of the current block is reconstructed from the transform coefficient.

According to an embodiment, the decoder may adaptively select the transform coding of FIG. 11 and the transform coding of FIG. 12 with respect to the current block. Alternatively, only one of the transform coding of FIG. 11 and the transform coding of FIG. 12 is applicable to the decoder.

The secondary transform of FIG. 9 is applicable to a low frequency region including a low-frequency transform coefficient when the current block is intra predicted. Meanwhile, secondary transform may not be applied to a high frequency region including a high-frequency transform coefficient. Alternatively, when the current block is inter predicted, secondary transform may not be applied to the current block.

According to an embodiment, the low frequency region may be determined according to the size of the current block. For example, when at least one of the height or width of the current block is less than 8, the low frequency region may be determined as a 4×4 subblock at the top left side of the current block. In contrast, when both the height and width of the current block are greater than or equal to 8, the low frequency region may be determined as a ¬-shaped subblock at the top left side of the current block.

Figure 13:
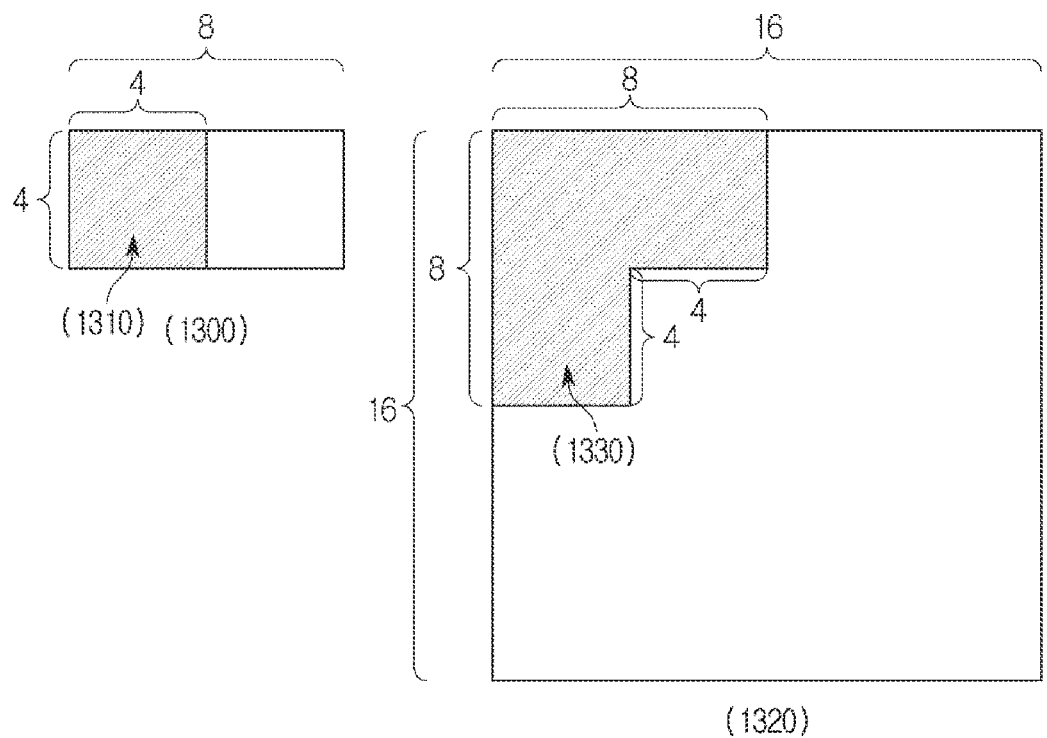
FIG. 13 is a view showing an embodiment of a low frequency region of secondary transform.

FIG. 13 is a view showing an embodiment of a low frequency region of secondary transform.

In FIG. 13, when the size of a current block 1300 is 8×4, the size of a low frequency region 1310 may be determined as 4×4. In addition, when the size of a current block 1320 is 16×16, a low frequency region 1330 may be determined as a region obtained by excluding a 4×4 block at the bottom right side from a block having a size of 8×8.

According to an embodiment, the low frequency region may be scanned according to a scan method determined according to an intra prediction mode. For example, when the prediction direction of the intra prediction mode is close to a horizontal direction, the scan method may be determined as horizontal scan. In addition, when the prediction direction of the intra prediction mode is close to a vertical direction, the scan method may be determined as vertical scan.

According to an embodiment, according to scan of the low frequency region, a first one-dimensional array including a first transform coefficient is generated. In addition, according to a product of the first one-dimensional array and a secondary transform matrix, a second one-dimensional array including a second transform coefficient is determined. The number of secondary transform coefficients included in the second one-dimensional array is determined according to the size of the current block. For example, when the size of the current block is 4×4 or 8×8, it may be determined that eight secondary transform coefficients are included in the second one-dimensional array. Alternatively, when the size of the current block is not 4×4 or 8×8, it may be determined that 16 secondary transform coefficients are included in the second one-dimensional array. Alternatively, the size of the secondary transform coefficient included in the second one-dimensional array may increase in proportion to the size of the current block.

According to an embodiment, the secondary transform matrix used for secondary transform may be determined according to the intra prediction mode of the current block. In addition, the secondary transform matrix may be determined by a secondary transform index. In addition, the secondary transform matrix may be determined according to the number of first transform coefficients of the first one-dimensional array and/or the number of second transform coefficients of the second one-dimensional array. In addition, a secondary transform matrix set including a plurality of secondary transform matrices may be selected according to the intra prediction mode of the current block. In addition, one of the plurality of secondary transform matrices of the secondary transform matrix set may be selected according to at least one of the secondary transform index, the number of first transform coefficients of the first one-dimensional array and the number of second transform coefficients of the second one-dimensional array. The secondary transform index is set to indicate the secondary transform matrix having optimal coding efficiency.

According to an embodiment, the secondary transform coefficients included in the second one-dimensional array may be arranged in a predetermined region of the current block according to a predetermined scan order. For example, the secondary transform coefficients included in the second one-dimensional array may be arranged in a 4×4 subblock at the top left side of the current block according to a predetermined scan order. The predetermined scan order may be one of diagonal scan, reverse diagonal scan, zigzag scan, reverse zigzag scan, horizontal scan, or vertical scan. The scan order will be described in detail below with reference to FIGS. 25 to 30.

According to an embodiment, the second transform coefficients other than the second transform coefficients defined from the second one-dimensional array among the second transform coefficients of the low frequency region may be determined as 0. Accordingly, the number of valid transform coefficients of the current block may be reduced due to second transform.

The secondary inverse transform of FIG. 11 may be performed in the opposite way of the secondary transform of FIG. 9. For example, a predetermined number of non-zero second transform coefficients in the low frequency region of the current block may be scanned according to a predetermined scan order. The number of non-zero second transform coefficients may be determined according to the size of the current block. The predetermined scan order may be one of diagonal scan, reverse diagonal scan, zigzag scan, reverse zigzag scan, horizontal scan, or vertical scan.

By the product of the second one-dimensional array including the scanned second transform coefficients and the second inverse transform matrix, the first one-dimensional array including first transform coefficients is generated. The secondary inverse transform matrix may be determined according to at least one of the intra prediction mode of the current block, the secondary transform index acquired from a bitstream, the number of first transform coefficients of the first one-dimensional array or the number of second transform coefficients of the second one-dimensional array. The number of first transform coefficients of the first one-dimensional array may be determined according to the size of the current block. The first transform coefficients of the first one-dimensional array are arranged in the low frequency region according to a predetermined scan order. The predetermined scan order may be determined according to the intra prediction mode of the current block.

A syntax element indicating whether to allow secondary transform and secondary inverse transform may be transmitted in units of video, coded video sequence (CVS), picture, slice, slice segment, and/or coding tree unit (CTU), which is a higher unit of a current block. When secondary inverse transform is not allowed by the syntax elements of the higher unit of the current block, secondary inverse transform may not be performed with respect to the current block. In addition, when a last subblock including a valid transform coefficient in the current block is not a top left subblock, secondary inverse transform may not be performed with respect to the current block. In addition, when the current block has a size of 4×4 or 8×8, if there is a non-zero transform coefficient among post-order transform coefficients according to the predetermined scan order of the top left subblock, secondary inverse transform may not be performed with respect to the current block. In addition, when the current block is inter predicted, secondary inverse transform may not be performed with respect to the current block.

In the present disclosure, the transform coefficient grouping method and the transform coefficient scanning method may be applied to at least one of the transform coefficient, the first transform coefficient, the second transform coefficient and the transform coefficient level of FIGS. 9 to 12. In the present disclosure, the transform coefficient of the current block may mean a coefficient derived according to transform of the residual signal of the current block. Alternatively, the transform coefficient may mean a quantized level value. In transform coefficient encoding/decoding of the current block, transform coefficient grouping may be performed according to at least one of a fixed-size transform coefficient grouping method or a variable block transform coefficient grouping method.

According to an embodiment, transform coefficient encoding/decoding may be independently performed with respect to K transform coefficient groups. Predictive encoding/decoding may be independently performed with respect to K transform coefficient groups. Transform and quantization may be independently performed with respect to K transform coefficient groups. Inverse transform and dequantization may be independently performed with respect to K transform coefficient groups. K is a positive integer.

Fixed-size transform coefficient grouping may be performed with respect to the current block. According to fixed-size transform coefficient grouping, the transform coefficient groups of the current block have a block shape having a constant size. For example, the transform coefficients of the current block may be divided according to the transform coefficient group having a fixed size of M (width)×N (height).

FIGS. 14 to 17 show embodiments of fixed-size transform coefficient grouping.

Figure 14:
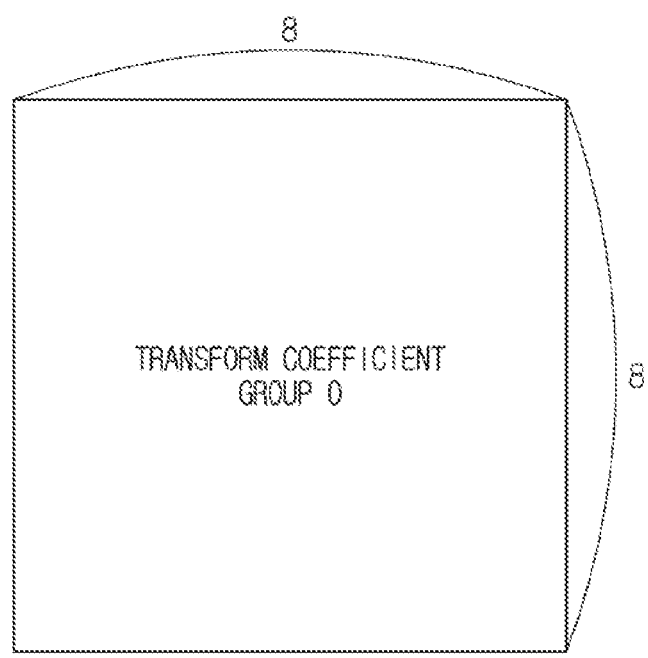
FIG. 14 is a view showing an embodiment in which a current block includes one transform coefficient group having the same size as the current block.

FIG. 14 is a view showing an embodiment in which a current block includes one transform coefficient group having the same size as the current block. In FIG. 14, when the size of the current block is 8×8 and the default size of a transform coefficient group is 8×8, the current block may include only one transform coefficient group (transform coefficient group 0) having the same size.

FIG. 15 is a view showing an embodiment in which a current block includes a plurality of transform coefficient groups. In FIG. 15, when the size of the current block is 16×16 and the default size of a transform coefficient group is 4×4, the current block may include 16 transform coefficient groups (transform coefficient groups 0 to 15).

FIG. 16 is a view showing an embodiment in which a current block includes a plurality of transform coefficient groups. If the height of the current block is not an integer multiple of the default height of a transform coefficient group and/or if the width of the current block is not an integer multiple of the default width of a transform coefficient group, the sizes of the transform coefficient groups of the current block may be different.

For example, as shown in FIG. 16, when the size of the current block is 16×16 and the default size of a transform coefficient group is 5×5, the current block may include 5×1, 1×5 or 1×1 transform coefficient groups adjacent to the right boundary and/or lower boundary of the current block, in addition to a transform coefficient group having a size of 5×5.

FIG. 17 is a view showing an embodiment in which a current block includes one or more transform coefficient groups when a default height and/or default width of a transform coefficient group is greater than those of a current block. When the default height of the transform coefficient group is greater than the height of the current block, the height of one or more transform coefficient groups included in the current block may be set to be equal to that of the current block. In addition, when the default width of the transform coefficient group is greater than the width of the current block, the width of one or more transform coefficient groups included in the current block may be set to be equal to that of the current block.

For example, as shown in FIG. 17, when the size of the current block is 16×4 and the default size of the transform coefficient group is 8×8, two 8×4 transform coefficient groups may be included in the current block.

The size of the current block and the default size of the transform coefficient group of FIGS. 14 to 17 are examples of fixed-size transform coefficient grouping, and the fixed-size transform coefficient grouping of the present disclosure is not limited by the size of the current block and the default size of the transform coefficient group of FIGS. 13 to 16.

Figure 19:
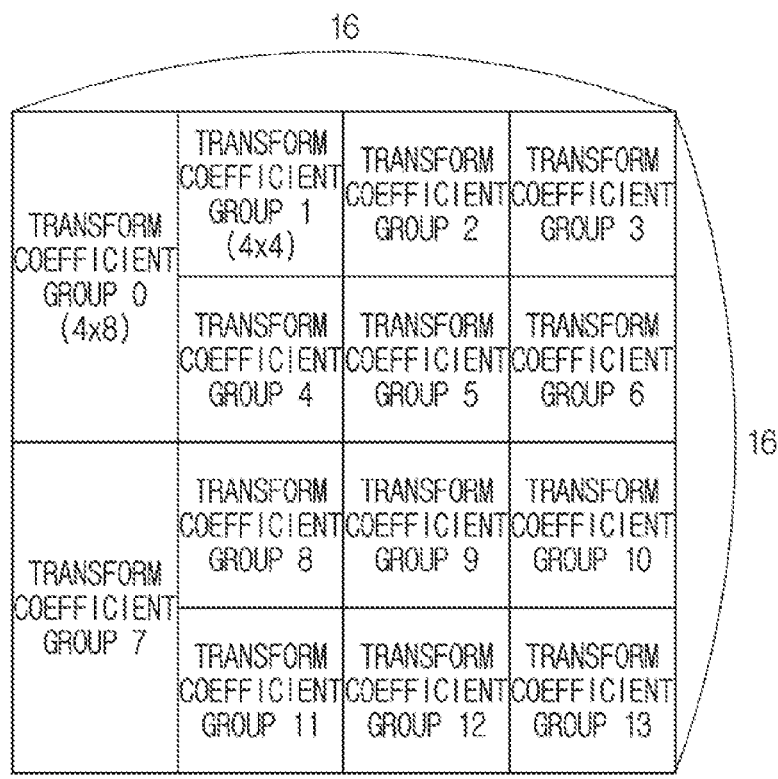
Figure 20:
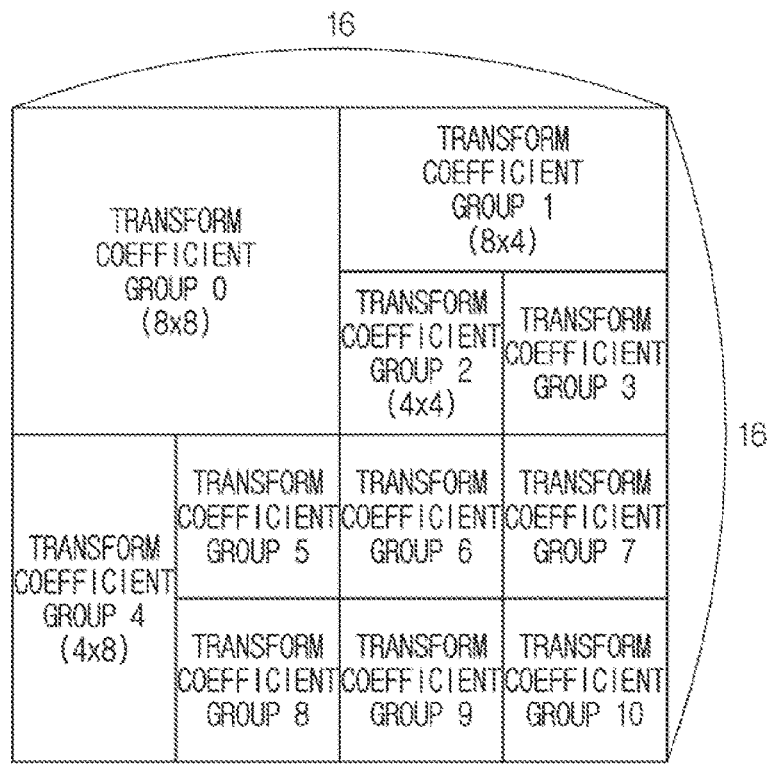

FIGS. 18 to 20 are views showing an embodiment of variable-size transform coefficient grouping.

Transform coefficient groups included in the current block may have different sizes. The locations and sizes of the transform coefficient groups may be determined to have optimal coding efficient of the current block. A plurality of partitioned transform coefficient groups may be set not to overlap each other.

FIG. 18 shows an embodiment of variable-size transform coefficient grouping. For example, when the size of the current block is 16×16, the size of transform coefficient group 0 at the top left location may be determined as 8×8, and the size of the other transform coefficient groups (transform coefficient groups 1 to 12) may be determined as 4×4.

FIG. 19 shows an embodiment of variable-size transform coefficient grouping. For example, when the size of the current block is 16×16, the size of transform coefficient groups 0 and 7 of the left location may be determined as 4×8 and the size of the other transform coefficient groups (transform coefficient groups 1 to 6 and 8 to 13) may be determined as 4×4. Alternatively, in some embodiments, unlike FIG. 18, the current block having a size of 16×16 may include two 8×4 transform coefficient groups at the top location and the other transform coefficient groups having a size of 4×4.

FIG. 20 shows an embodiment of variable-size transform coefficient grouping. For example, when the size of the current block is 16×16, the size of transform coefficient 0 at the top left location may be determined as 8×8, the size of transform coefficient group 4 at the left location may be determined as 4×8, the size of transform coefficient group 1 at the top location may be determined as 8×4, and the size of the other transform coefficient groups (transform coefficient groups 2, 3, and 5 to 10) may be determined as 4×4.

The variable-size transform coefficient grouping method of the present disclosure is not limited to the embodiments of FIGS. 17 to 19. In addition, the size of the transform coefficient group included in the current block may be adaptively determined according to the size of the current block, a prediction mode, a transform mode, transform coefficient information, etc.

In the encoder, a variable-size transform coefficient grouping method optimized for encoding of the current block may be selected from among a plurality of variable-size transform coefficient grouping methods. In addition, the encoder may generate transform coefficient group information indicating the variable-size transform coefficient grouping method optimized for encoding of the current block from among the plurality of variable-size transform coefficient grouping methods. For example, the transform coefficient group may indicate a grouping method optimized for the current block among five variable-size transform coefficient grouping methods.

In performing of the transform coefficient grouping, the transform coefficient grouping method may be determined based on at least one of encoding parameters, such as a slice type, an encoding mode, an intra prediction mode, an inter prediction mode, a transform coefficient value, the size/shape of the current block, whether to apply first transform/inverse transform or whether to apply second transform/inverse transform. The transform coefficient grouping method may be at least one of a fixed transform coefficient grouping method or a variable transform coefficient grouping method. In addition, the default size of the transform coefficient group used in fixed transform coefficient grouping and the size of each transform coefficient group used for variable transform coefficient grouping may be determined by the above-described parameters.

According to an embodiment, variable transform coefficient grouping may be performed when the current block is in an intra prediction mode and fixed transform coefficient grouping may be performed when the current block is in an inter prediction mode.

According to an embodiment, the transform coefficient grouping method may be determined according to the intra prediction mode of the current block. For example, the transform coefficient grouping methods when the intra prediction mode is DC/Planar, when the intra prediction mode is a vertical mode and when the intra prediction mode is a horizontal mode may be differently set.

According to an embodiment, variable transform coefficient grouping may be performed when the current slice is I slice and fixed transform coefficient grouping may be performed when the current slice is P/B slice. The current block may be at least one of a coding block (CU), a prediction block (PU), a sub-coding block (sub-CU), a transform block (TU) or a sub-transform block (sub-TU).

According to an embodiment, when the size of the current block is N×M, if min(N,M) or max(N, M) is greater than an arbitrary positive-integer threshold K, variable transform coefficient grouping may be performed and, otherwise, fixed transform coefficient grouping may be performed.

According to an embodiment, when the size of the current block is N×M, fixed transform coefficient grouping may be performed if N and M are the same, and variable transform coefficient grouping may be performed if N and M are different.

According to an embodiment, fixed transform coefficient grouping may be performed with respect to a transform coefficient, to which a first transform is applied, and variable transform coefficient grouping may be performed with respect to a transform coefficient, to which a second transform is applied.

According to an embodiment, the current block may include one transform coefficient group having a minimum size and including all non-zero transform coefficients in the current block. The size of the transform coefficient group may be (X_max+1)×(Y_max+1). Here, X_max may be a maximum value of the X-coordinate locations of the non-zero transform coefficients in the current block and Y_max is a maximum value of the Y-coordinate locations.

According to an embodiment, when the size of the current block is N×M, if min(N,M) or max(N, M) is greater than an arbitrary positive-integer threshold K, one transform coefficient group having a minimum size and including all non-zero transform coefficients in the current block may be determined.

Figure 21:
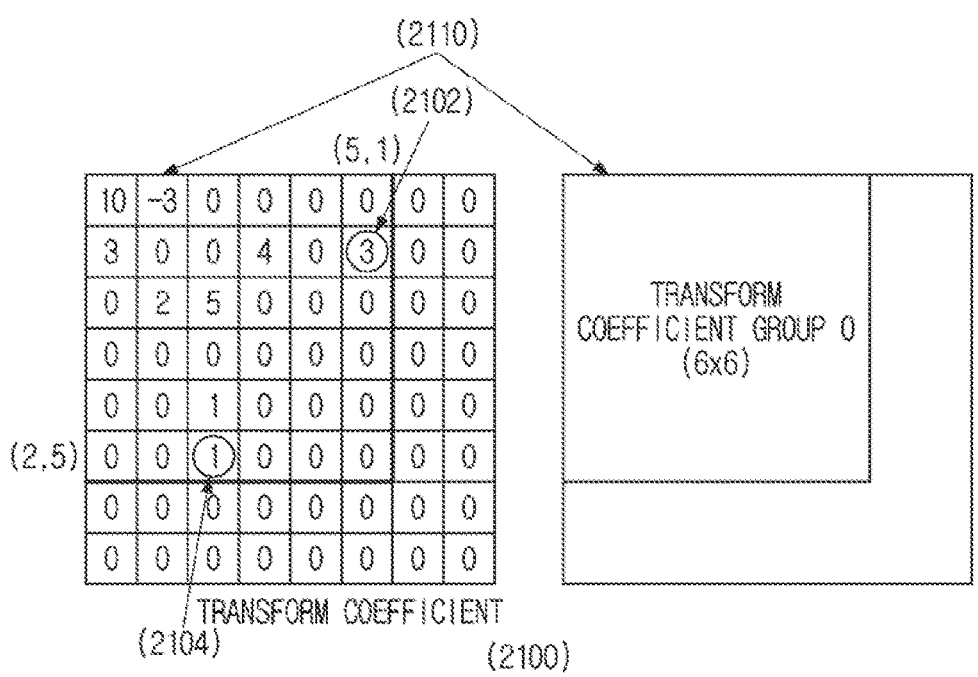
FIG. 21 is a view showing one transform coefficient group having a minimum size and including all non-zero transform coefficients in a current block.

FIG. 21 is a view showing one transform coefficient group having a minimum size and including all non-zero transform coefficients in a current block.

A transform coefficient 2102 located at the rightmost side among the non-zero transform coefficients in a current block 2100 is located at (5, 1). A transform coefficient 2104 located at the lowermost side among the non-zero transform coefficients in the current block 2100 is located at (2, 5). Therefore, the minimum size of the transform coefficient group 2110 which may include all non-zero transform coefficients is 6×6.

The value of the transform coefficients which are not included in the transform coefficient group 2110 in the current block 2100 is 0. Therefore, information on the transform coefficients which are not included in the transform coefficient group 2110 may be omitted. By encoding only the transform coefficients which are not included in the transform coefficient group 2110, it is possible to increase coding efficiency.

FIGS. 22 to 25 show embodiments of determining a transform coefficient grouping method according to the size of a current block.

Figure 22:
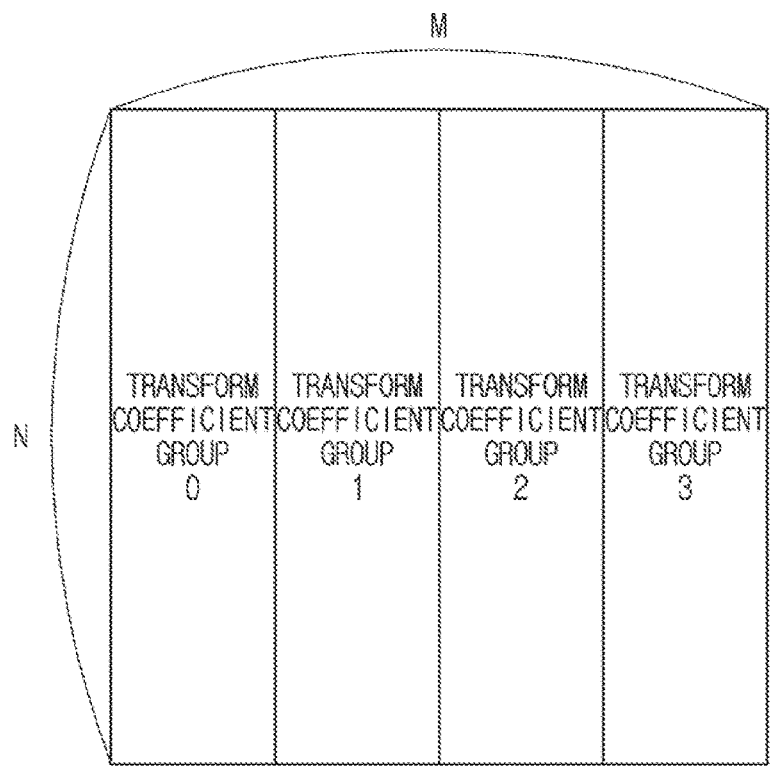
FIGS. 22 and 23 are views showing embodiments of a method of determining a transform coefficient group of a current block according to the width of a current block.
Figure 23:
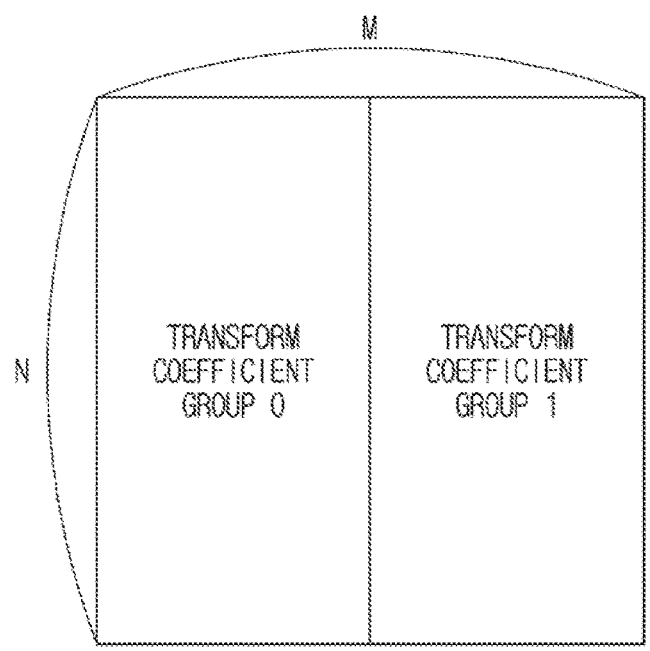

FIGS. 22 and 23 are views showing embodiments of a method of determining a transform coefficient group of a current block according to the width of a current block.

As shown in FIG. 22, if the width M of the current block is greater (or less) than an arbitrary threshold, the current block may include four transform coefficient groups (transform coefficient groups 0 to 3) having a size of M/4×N.

As shown in FIG. 23, if the width M of the current block is greater (or less) than an arbitrary threshold, the current block may include two transform coefficient groups (transform coefficient groups 0 and 1) having a size of M/2×N. Alternatively, when the width M of the current block is greater than a first threshold and is less than a second threshold, the current block may include two transform coefficient groups (transform coefficient groups 0 and 1) having a size of M/2×N.

FIGS. 22 and 23 show embodiments in which current blocks include transform coefficient groups having widths ¼ and ½, respectively. However, the current block may be set to include a transform coefficient group having a width equal to or less than ⅛ according to the width of the current block.

Figure 24:
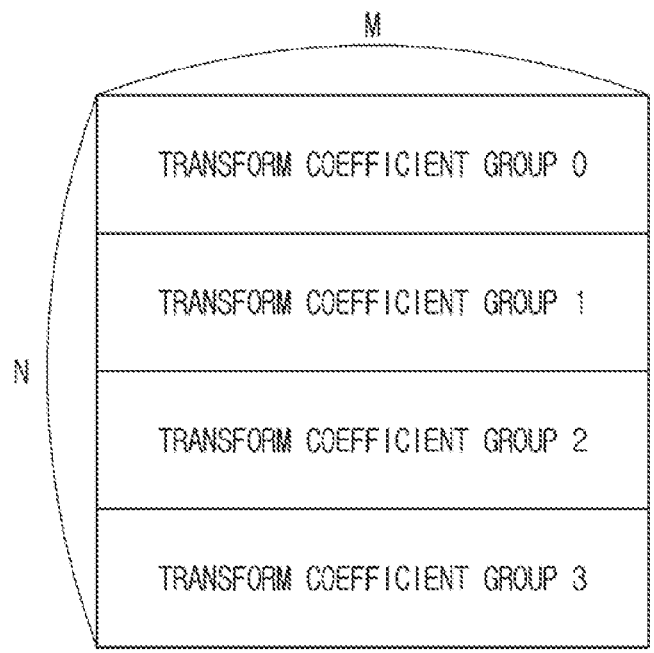
FIGS. 24 and 25 are views showing embodiments of a method of determining a transform coefficient group of a current block according to the height of a current block.
Figure 25:
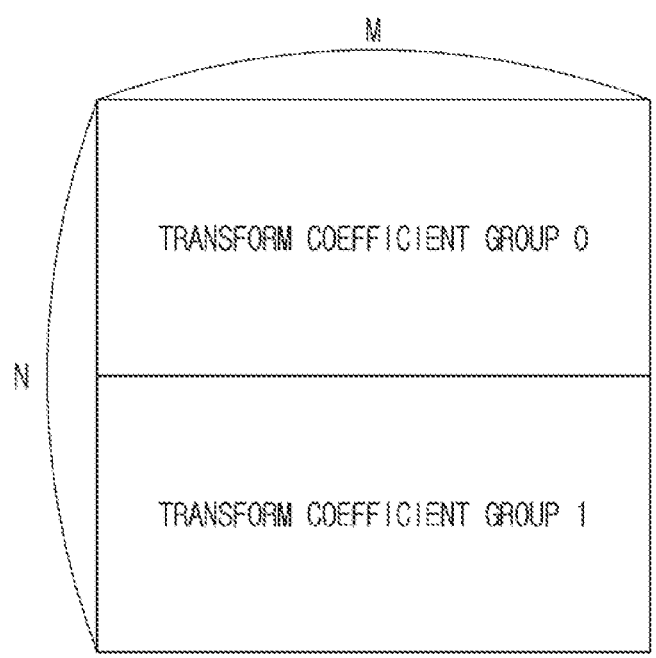

FIGS. 24 and 25 are views showing embodiments of a method of determining a transform coefficient group of a current block according to the height of a current block.

As shown in FIG. 24, if the height N of the current block is greater (or less) than an arbitrary threshold, the current block may include four transform coefficient groups (transform coefficient group 0 to 3) having a size of M×N/4.

As shown in FIG. 25, if the height N of the current block is greater (or less) than an arbitrary threshold, the current block may include two transform coefficient groups (transform coefficient groups 0 and 1) having a size of M×N/2. Alternatively, if the height N of the current block is greater than a first threshold and is less than a second threshold, the current block may include two transform coefficient groups (transform coefficient groups 0 and 1) having a size of M×N/2.

FIGS. 24 and 25 show embodiments in which current blocks include transform coefficient groups having heights of ¼ and ½, respectively. However, the current block may be set to include a transform coefficient group having a height equal to or less than ⅛ according to the height of the current block.

In FIGS. 22 to 25, the current block includes transform coefficient groups determined by partitioning the current block vertically or horizontally. However, unlike FIGS. 21 to 24, the current block may include transform coefficient groups determined by partitioning the current block vertically or horizontally according to the height and width of the current block.

According to an embodiment, the area of the transform coefficient group may be fixed for at least one unit of CU, CTU, brick, tile, slice, picture, or sequence. In the present disclosure, the area of the transform coefficient group may be a product of the height and width of the transform coefficient group. For example, the area of the transform coefficient group may have a value of 4, 8, 16, 32, 64, 128, 256, or 512.

According to an embodiment, the area of the transform coefficient group may be transmitted in at least one unit of CU, CTU, brick, tile, slice, picture, or sequence. For example, a binary log value of the area of the transform coefficient group may be transmitted. For example, a value obtained by subtracting a predetermined number from the binary log value of the area of the transform coefficient group may be transmitted. The predetermined number may be determined according to the minimum value of the area of the transform coefficient group. Alternatively, the predetermined number may be determined as one of arbitrary positive integers.

According to an embodiment, the transform coefficient group may be additionally partitioned into sub transform coefficient groups. For example, transform and quantization may be performed in transform coefficient group units, and transform coefficient scanning and binarization may be performed in of sub transform coefficient group units.

According to an embodiment, in performing of the transform coefficient grouping of the current block, the size and shape of the transform coefficient group may be determined using the encoding information of a current block or a neighbor block.

According to an embodiment, the encoding information of the block may include at least one of the shape (square, vertical non-square, or horizontal non-square) of the block, the size (width, height or area), a prediction mode (intra, inter, IBC, palette or ISP), a quantization parameter QP, boundary information (picture, slice, tile, brick, CTU, CU, PU or TU), image components (R, G, B, Y, U, V), whether to perform a transform (transform, transform skip, secondary transform), a transform type (DCT2, DST7, DCT8), or an intra prediction mode. In the present disclosure, the vertical non-square shape means a shape of a block having a height greater than a width. Similarly, the horizontal non-square shape means a shape of a block having a width greater than a height.

The distribution characteristics of the transform coefficients may vary according to the encoding information of the current block. Accordingly, at least one of the shape, size of area (location) of the transform coefficient group may be adaptively determined according to the distribution characteristics of the transform coefficients, thereby improving encoding performance.

According to an embodiment, the shape and size of the transform coefficient group may be adaptively determined according to the shape of the current block.

For example, if the current block has a vertical non-square shape, the transform coefficient group may also have a vertical non-square shape. For example, the size of the transform coefficient group may be one of 1 (width)×2 (height), 1×4, 1×8, 1×16, 1×32, 1×64, 2×4, 2×8, 2×16, 2×32, 4×8 or 4×16. Alternatively, on the contrary, if the current block has a vertical non-square shape, the transform coefficient group may be determined to have a horizontal non-square shape.

For example, if the current block has a horizontal non-square shape, the transform coefficient group may also have a horizontal non-square shape. For example, the size of the transform coefficient group may be one of 2×1, 4×1, 8×1, 32×1, 64×1, 4×2, 8×2, 16×2, 32×2, 8×4 or 16×4. Conversely, if the current block has a horizontal non-square shape, the transform coefficient group may be determined to have a vertical non-square shape.

For example, if the current block has a square shape, the transform coefficient group may also have a square shape. For example, the size of the transform coefficient group may be one of 1×1, 2×2, 4×4 or 8×8.

According to an embodiment, the shape and size of the transform coefficient group may be determined according to a difference between the width and height of the current block.

For example, when the current block satisfies the condition of "(width)>α*(height)", the shape of the transform coefficient group may be a horizontal non-square shape. For example, the size of the transform coefficient group may be one of 2×1, 4×1, 8×1, 32×1, 64×1, 4×2, 8×2, 16×2, 32×2, 8×4 or 16×4.

For example, when the current block satisfies "(height)>α*(width)", the shape of the transform coefficient group may be a vertical non-square shape. For example, the size of the transform coefficient group may be one of 1×2, 1×4, 1×8, 1×16, 1×32, 1×64, 2×4, 2×8, 2×16, 2×32, 4×8 or 4×16.

For example, when the current block does not satisfy at least one of the above conditions, the shape of the transform coefficient group may be a square shape. For example, the size of the transform coefficient group may be one of 1×1, 2×2, 4×4 or 8×8.

α may be a predefined arbitrary constant or a variable adaptively determined according to the encoding information of the current block or a neighbor block. α may be an integer or a fraction. For example, a may be 2 (integer).

According to an embodiment, the shape and size of the transform coefficient group may be adaptively determined according to the prediction information (e.g., horizontal ISP or vertical ISP) of the current block.

According to an embodiment, the transform coefficient group may have the same shape and size as the current block. In addition, the current block may include one transform coefficient group. For example, when the size of the current block is N×M, the size of the transform coefficient group may be N×M. N and M may be positive integers, which mean the width and the height, respectively.

According to an embodiment, the area of the transform coefficient group may be equal to or less than a predefined maximum area threshold. For example, when the maximum area of the transform coefficient group is 16, the shape of the transform coefficient group may be one of 1×1, 2×2, 2×4, 2×8, 4×2, 4×4 or 8×2.

According to an embodiment, the width and height of the current block may be mapped to the width and height of the transform coefficient group. A mapping table indicating a relationship between the width and height of the current block and the width and height of the transform coefficient group may be stored in an encoder and a decoder. The mapping table may be determined according to the embodiments of the method of determining the transform coefficient group described in the present disclosure.

For example, the mapping table may be configured as shown in Tables 1 to 5.

According to an embodiment, the mapping table may be adaptively selected using the encoding information of the current block or the neighbor block. For example, the mapping table may be adaptively selected depending on whether the current block is transmitted. For example, the size of the transform coefficient group may be determined based on Table 3 when a secondary transform is not performed and may be defined based on Table 2 when secondary transform is performed.

According to an embodiment, the mapping table may be adaptively selected according to the image component of the current block. For example, the size of the transform coefficient group may be determined based on Table 1 when the color component of the current block is luma and may be determined based on Table 2 when the color component is chroma.

TABLE 1

| H | W | | | | | | |
|---|---|---|---|---|---|---|---|
|   | 1 | 2 | 4 | 8 | 16 | 32 | 64 |
| 1 | 1 × 1 | 1 × 2 | 1 × 4 | 1 × 8 | 1 × 16 | 1 × 16 | 1 × 16 |
| 2 | 2 × 1 | 2 × 2 | 2 × 4 | 2 × 8 | 2 × 8 | 2 × 8 | 2 × 8 |
| 4 | 4 × 1 | 4 × 2 | 4 × 4 | 4 × 4 | 4 × 4 | 4 × 4 | 4 × 4 |
| 8 | 8 × 1 | 8 × 2 | 4 × 4 | 4 × 4 | 4 × 4 | 4 × 4 | 4 × 4 |

TABLE 1-continued

| | W | | | | | |
|---|---|---|---|---|---|---|
| H | 1 | 2 | 4 | 8 | 16 | 32 | 64 |
| 16 | 16 × 1 | 8 × 2 | 4 × 4 | 4 × 4 | 4 × 4 | 4 × 4 | 4 × 4 |
| 32 | 16 × 1 | 8 × 2 | 4 × 4 | 4 × 4 | 4 × 4 | 4 × 4 | 4 × 4 |
| 64 | 16 × 1 | 8 × 2 | 4 × 4 | 4 × 4 | 4 × 4 | 4 × 4 | 4 × 4 |

TABLE 2

| | W | | | | | |
|---|---|---|---|---|---|---|
| H | 1 | 2 | 4 | 8 | 16 | 32 | 64 |
| 1 | 1 × 1 | 1 × 1 | 1 × 1 | 1 × 1 | 1 × 1 | 1 × 1 | 1 × 1 |
| 2 | 1 × 1 | 2 × 2 | 2 × 2 | 2 × 2 | 2 × 2 | 2 × 2 | 2 × 2 |
| 4 | 1 × 1 | 2 × 2 | 4 × 4 | 4 × 4 | 4 × 4 | 4 × 4 | 4 × 4 |
| 8 | 1 × 1 | 2 × 2 | 4 × 4 | 4 × 4 | 4 × 4 | 4 × 4 | 4 × 4 |
| 16 | 1 × 1 | 2 × 2 | 4 × 4 | 4 × 4 | 4 × 4 | 4 × 4 | 4 × 4 |
| 32 | 1 × 1 | 2 × 2 | 4 × 4 | 4 × 4 | 4 × 4 | 4 × 4 | 4 × 4 |
| 64 | 1 × 1 | 2 × 2 | 4 × 4 | 4 × 4 | 4 × 4 | 4 × 4 | 4 × 4 |

TABLE 3

| | W | | | | | |
|---|---|---|---|---|---|---|
| H | 1 | 2 | 4 | 8 | 16 | 32 | 64 |
| 1 | 1 × 1 | 1 × 2 | 1 × 4 | 1 × 8 | 1 × 16 | 1 × 16 | 1 × 16 |
| 2 | 2 × 1 | 2 × 2 | 2 × 4 | 2 × 8 | 2 × 8 | 2 × 8 | 2 × 8 |
| 4 | 4 × 1 | 4 × 2 | 4 × 4 | 4 × 4 | 2 × 8 | 2 × 8 | 2 × 8 |
| 8 | 8 × 1 | 8 × 2 | 4 × 4 | 4 × 4 | 4 × 4 | 2 × 8 | 2 × 8 |
| 16 | 16 × 1 | 8 × 2 | 8 × 2 | 4 × 4 | 4 × 4 | 4 × 4 | 2 × 8 |
| 32 | 16 × 1 | 8 × 2 | 8 × 2 | 8 × 2 | 4 × 4 | 4 × 4 | 4 × 4 |
| 64 | 16 × 1 | 8 × 2 | 8 × 2 | 8 × 2 | 8 × 2 | 4 × 4 | 4 × 4 |

TABLE 4

| | W | | | | | |
|---|---|---|---|---|---|---|
| H | 1 | 2 | 4 | 8 | 16 | 32 | 64 |
| 1 | 1 × 1 | 1 × 2 | 1 × 4 | 1 × 8 | 1 × 16 | 1 × 16 | 1 × 16 |
| 2 | 2 × 1 | 2 × 2 | 2 × 4 | 2 × 8 | 2 × 8 | 2 × 8 | 2 × 8 |
| 4 | 4 × 1 | 4 × 2 | 4 × 4 | 4 × 4 | 4 × 4 | 4 × 4 | 4 × 4 |
| 8 | 8 × 1 | 8 × 2 | 4 × 4 | 4 × 4 | 4 × 4 | 2 × 8 | 2 × 8 |
| 16 | 16 × 1 | 8 × 2 | 4 × 4 | 4 × 4 | 4 × 4 | 4 × 4 | 2 × 8 |
| 32 | 16 × 1 | 8 × 2 | 4 × 4 | 8 × 2 | 4 × 4 | 4 × 4 | 4 × 4 |
| 64 | 16 × 1 | 8 × 2 | 4 × 4 | 8 × 2 | 8 × 2 | 4 × 4 | 4 × 4 |

TABLE 5

| | W | | | | | |
|---|---|---|---|---|---|---|
| H | 1 | 2 | 4 | 8 | 16 | 32 | 64 |
| 1 | 1 × 1 | 1 × 2 | 1 × 4 | 1 × 8 | 1 × 16 | 1 × 16 | 1 × 16 |
| 2 | 2 × 1 | 2 × 2 | 2 × 4 | 2 × 8 | 2 × 8 | 2 × 8 | 2 × 8 |
| 4 | 4 × 1 | 4 × 2 | 4 × 4 | 4 × 4 | 4 × 4 | 4 × 4 | 2 × 8 |
| 8 | 8 × 1 | 8 × 2 | 4 × 4 | 4 × 4 | 4 × 4 | 2 × 8 | 2 × 8 |
| 16 | 16 × 1 | 8 × 2 | 4 × 4 | 4 × 4 | 4 × 4 | 2 × 8 | 2 × 8 |
| 32 | 16 × 1 | 8 × 2 | 4 × 4 | 8 × 2 | 8 × 2 | 4 × 4 | 2 × 8 |
| 64 | 16 × 1 | 8 × 2 | 4 × 4 | 8 × 2 | 8 × 2 | 8 × 2 | 4 × 4 |

According to an embodiment, in performing of the transform coefficient grouping, transform coefficient grouping may be performed using a prediction mode, a scan method and/or location information of a last non-zero coefficient.

In performing of transform coefficient grouping, transform coefficient grouping may be performed with respect to a region except for a zero-out area predefined by the encoder/decoder. The zero-out region may mean a region, to which a transform coefficient having a value of 0 is assigned. Alternatively, the zero-out region may mean a region to which a transform coefficient having a value of 0 is assigned in a transform matrix.

According to an embodiment, in defining of the zero-out region, the zero-out region may be adaptively determined using the encoding information of the current block or the neighbor block. For example, the encoding information may include at least one of the shape (square, vertical non-square, or horizontal non-square) of the block, the size (width, height or area), a prediction mode (intra, inter, IBC, palette, ISP), a quantization parameter QP, boundary information (picture, slice, tile, brick, CTU, CU, PU or TU), image components (R, G, B, Y, U, V), whether to perform a transform (transform, transform skip, secondary transform), or transform information (DCT2, DST7, DCT8).

According to an embodiment, the distribution characteristics of the transform coefficients may vary according to the encoding information of the current block. For example, the degree of energy concentration may vary according to the encoding information of the current block. Therefore, the zero-out region may be adaptively determined according to the distribution characteristics of the transform coefficient, thereby improving coding performance.

According to an embodiment, the zero-out region may be determined according to a threshold T1 of a zero-out width and a threshold T2 of a zero-out height. T1 or T2 may be defined as one of 4, 8, 16, 32 or 64. T1 and T2 may mean x- and y-coordinate thresholds of the transform coefficient. In addition, a location (x, y) of the transform coefficient having a value greater than or equal to T1 or T2 may be included in the zero-out region. On the contrary, a location (x, y) of the transform coefficient having a value equal to or less than T1 or T2 may not be included in the zero-out region. The region of the samples which are not included in the zero-out region may be defined as a transform coefficient coding region. Accordingly, a transform coefficient coding region may be determined according to T1 and T2.

In the present disclosure, (x, y) is determined based on the top left transform coefficient of the block. A location (0, 0) indicates the location of the top left transform coefficient. The x value increases as the transform coefficient is located on the right. In addition, the y value increases as the transform coefficient is located on the bottom.

If T1 is defined as 16, transform coefficients having x-coordinate values of 0 to 15 are not included in the zero-out region. Accordingly, the values of the transform coefficients having the x-coordinate values of 0 to 15 may not be 0. If T2 is defined as 16, transform coefficients having y-coordinate values of 0 to 15 are not included in the zero-out region. Accordingly, the values of the transform coefficients having the y-coordinate values of 0 to 15 may not be 0.

If T1 is defined as 32, transform coefficients having x-coordinate values of 0 to 31 are not included in the zero-out region. Accordingly, the values of the transform coefficients having the x-coordinate values of 0 to 31 may not be 0. If T2 is defined as 32, transform coefficients having y-coordinate values of 0 to 31 are not included in the zero-out region. Accordingly, the values of the transform coefficients having the y-coordinate values of 0 to 31 may not be 0.

According to an embodiment, if the size of the current block is equal to or less than a predetermined size, the zero-out region is not included in the current block. For example, if T1 and T2 are defined as 16, a block having a size equal to or less than a size of 16×16 does not include the zero-out region. Accordingly, the zero-out region may not be defined with respect to a block having a size equal to or less than a predetermined size (e.g., 16×16, 32×32, 64×64, etc.).

According to an embodiment, if the size of the current block is greater than a predetermined size, the zero-out region is included in the current block. For example, if T1 and T2 are defined as 32, a block having a greater size greater than 32×32 includes a zero-out region. If the current block has a size of 64×64, the zero-out region is set to include a transform coefficient located at a coordinate (x, y) having min(x,y) greater than 32. Accordingly, the zero-out region may be defined with respect to a block having a size equal to or greater than a predetermined size (e.g., 16×16, 32×32, 64×64, etc.)

According to an embodiment, T1 and T2 may be determined according to the value of max(M,N) with respect to a current block having a size of M×N. For example, with respect to the current block having the size of M×N, when max(M,N) is 32, a transform coefficient located at a location (x, y) having max(x, y) greater than 16 may be defined as a zero-out region. In addition, with respect to the current block having the size of M×N, when max(M,N) is greater than 64, a transform coefficient located at a location (x, y) having max(x, y) greater than 32 may be defined as a zero-out region. With respect to the current block having the size of M×N, when max(M,N) is less than 16, the current block may not include the zero-out region.

According to an embodiment, if the width of the current block is 32 and the height of the current block is less than 64, the threshold T1 of the zero-out width may be determined as 16. In addition, if the height of the current block is 32 and the width of the current block is less than 64, the threshold T2 of the zero-out height may be determined as 16.

According to an embodiment, if the current block is a luma block, the width of the current block is 32 and the height of the current block is less than 64, the threshold T1 of the zero-out width may be determined as 16. In addition, if the current block is a luma block, the height of the current block is 32 and the width of the current block is less than 64, the threshold T2 of the zero-out height may be determined as 16.

According to an embodiment, if a subblock transform is applied to the current block, the width of the current block is 32 and the height of the current block is less than 64, the threshold T1 of the zero-out width may be determined as 16. In addition, if a subblock transform is applied to the current block, the height of the current block is 32 and the width of the current block is less than 64, the threshold T2 of the zero-out height may be determined as 16.

According to an embodiment, if the width of the current block is not 32 or the height of the current block is equal to or greater than 64, the threshold T1 of the zero-out width may be determined as the smaller value of the width of the current block and 32. If the height of the current block is not 32 or the width of the current block is equal to or greater than 64, the threshold T2 of the zero-out height may be determined as the smaller value of the height of the current block and 32.

According to an embodiment, when the current block is a chroma block, the threshold T1 of the zero-out width may be determined as the smaller value of the width of the current block and 32. In addition, when the current block is a chroma block, the threshold T2 of the zero-out height may be determined as the smaller value of the height of the current block and 32.

According to an embodiment, when a subblock transform is not applied to the current block, the threshold T1 of the zero-out width may be determined as the smaller value of the width of the current block and 32. In addition, when the subblock transform is not applied to the current block, the threshold T2 of the zero-out height may be determined as the smaller value of the height of the current block and 32.

According to an embodiment, if the size of the current block is 16×32, 32×16 or 32×32, both the threshold T1 of the zero-out width and the threshold T2 of the zero-out height of the current block may be determined as 16. If the size of the current block is 32×64, 64×32 or 64×64, both the threshold T1 of the zero-out width and the threshold T2 of the zero-out height of the current block may be determined as 32. If the size of the current block is greater than 64×64, both the threshold T1 of the zero-out width and the threshold T2 of the zero-out height of the current block may be determined as 32. If the size of the current block is 16×64, the threshold T1 of the zero-out width and the threshold T2 of the zero-out height of the current block may be determined as 16 and 32, respectively. If the size of the current block is 64×16, the threshold T1 of the zero-out width and the threshold T2 of the zero-out height of the current block may be determined as 32 and 16, respectively. If the size of the current block is 32×128, the threshold T1 of the zero-out width and the threshold T2 of the zero-out height of the current block may be determined as 32 and 64, respectively. If the size of the current block is 128×32, the threshold T1 of the zero-out width and the threshold T2 of the zero-out height of the current block may be determined as 64 and 32, respectively.

For example, if the x-coordinate location of the transform coefficient in the current block is greater than equal to T1, the value of the transform coefficient may be determined as 0. Alternatively, if the y-coordinate location of the transform coefficient in the current block is greater than or equal to T2, the value of the transform coefficient may be determined as 0. The (x, y) coordinate location of the transform coefficient may be determined based on the top left coordinate (e.g., (0, 0)) of the current block.

According to an embodiment, T1 and T2 may be adaptively determined according to the transform information of the current block. For example, if the vertical and horizontal transform information of the current block indicates DCT2, T1 and T2 may be determined as 16 or 32. For example, if the vertical and horizontal transform information of the current block does not indicate DCT2 (or indicates DST7 or DCT8), T1 and T2 may be determined as 8, 16 or 32. For example, when the horizontal transform information of the current block indicates DCT2, T1 may be determined as 32, and, when the vertical transform information of the current block does not indicate DCT2, T2 may be determined as 16. For example, when the horizontal transform information of the current block does not indicate DCT2, T1 may be determined as 16 and, when the vertical transform information indicates DCT2, T2 may be determined as 16.

According to an embodiment, T1 and T2 may be adaptively determined according to the prediction information (e.g., vertical ISP or horizontal ISP) of the current block. Here, ISP may mean an intra sub partition mode.

According to an embodiment, T1 and T2 may be adaptively determined according to the quantization parameter of the current block. For example, if the quantization parameter of the current block is greater than a predefined quantization parameter threshold T3, T1 and T2 may be determined as 4, 8, 16, or 32.

According to an embodiment, T1 and T2 may be adaptively determined according to the image component of the current block. For example, if the image component of the current block is luma, T1 and T2 may be 32. For example, if the image component of the current block is chroma, T1 and T2 may be determined as 16.

According to an embodiment, T1 and T2 may be adaptively determined according to the shape of the current block. If the current block has a vertical non-square shape, T1 and T2 may be determined such that the condition of T1<T2 is satisfied. For example, if the current block has a vertical non-square shape, T1 may be 16 and T2 may be 32. If the current block has a horizontal non-square shape, T1 and T2 may be determined such that the condition of T2<T1 is satisfied. For example, if the current block has a horizontal non-square shape, T1 may be 32 and T2 may be 16.

According to an embodiment, T1 and T2 may be determined according to a difference between the width and height of the current block. When the current block satisfies the condition of "(width)>α*(height)", T1 and T2 may be determined such that the condition of T2<T1 is satisfied. For example, when the current block satisfies the condition of "(width)>α*(height)", T1 may be 32 and T2 may be 16. When the current block satisfies the condition of "(height)>α*(width)", T1 and T2 may be determined such that the condition of T1<T2 is satisfied. For example, when the current block satisfies the condition of "(height)>α*(width)", T1 may be 16 and T2 may be 32.

According to an embodiment, when the above conditions ("(width)>α*(height)" and "(height)>α*(width)") are not satisfied, T1 and T2 may be determined to be the same. For example, when the above conditions are not satisfied, T1 and T2 may be determined as 16. Alternatively, when the above conditions are not satisfied, T1 and T2 may be determined as 32.

At this time, α may be a predefined arbitrary constant or a variable adaptively determined according to the encoding information of the current block or the neighbor block. α may be an integer or a fraction. For example, a may be 2 (integer).

According to an embodiment, T1 and T2 may be adaptively determined using a plurality of conditions among the above conditions. For example, when the current block is a luma component and a DCT2 transform is applied, T1 and T2 may be determined as 32. For example, when the current block is a luma component and a transform other than DCT2 transform is applied, T1 and T2 may be determined as 16. For example, when the current block is a chroma component and a DCT2 transform is applied, T1 and T2 may be determined as 16. For example, when the current block is a chroma component and a transform other than a DCT2 transform is applied, T1 and T2 may be determined as 8.

As described above, in encoding of the transform coefficient generated according to transform and quantization, sample information grouping may be performed. In addition, sample information grouping may be performed with respect to sample information other than the transform coefficient. For example, when the current block is reconstructed according to the palette mode, the current block may be predicted and reconstructed in units of a plurality of sample information groups.

According to an embodiment, when the current block is reconstructed according to the palette mode, the current block may be partitioned in units of a plurality of sample information groups according to one of the sample information grouping methods described with reference to FIGS. 13 to 24. In addition, the samples of the current block may be predicted and reconstructed for each sample information group according to the palette mode.

The palette mode refer to an encoding mode in which a palette constructed in predetermined colors is determined and a current block is reconstructed using only the colors of the palette. In the palette mode, if only a specific color is used in an image, high coding efficiency may be obtained. For example, if a document generated in a computer is transformed into an image format, only a specific color may be used for the generated image. In this case, it is possible to provide a higher coding rate by lossless coding according to the palette mode than by loss coding according to transform and quantization.

According to an embodiment, among the sample information of the palette mode, a palette index indicating the colors of the samples of the current block from the palette and a palette escape value indicating colors which are not included in the palette may be grouped. For example, the current block may be partitioned into a plurality of sample information groups according to the grouping methods shown in FIGS. 21 to 24. As the sample information is encoded in units of sample information groups, the size of a buffer for storing information on the palette index and the palette escape value is reduced. Accordingly, if the current block is large, overhead due to an excessive buffer size may be reduced.

According to an embodiment, the sample information group units according to the palette mode may be set to include a predetermined number of samples. The predetermined number may be 8, 16, 32, 64, etc. For example, when the predetermined number is 16 and the size of the current block is 8×8, the current block may be partitioned into four sample information groups having a size of 2×8 or 8×2. According to an embodiment, the size of the sample information group may be determined according to the scan method of the current block. For example, when the current block is scanned according to a horizontal scan method, the current block may be partitioned in a horizontal direction, thereby determining the sample information groups. Accordingly, the width of the sample information group is determined to be equal to the width of the current block, and the height of the sample information group is determined to be equal to a value obtained by dividing the height of the current block by the number of sample information groups. In addition, when the current block is scanned according to a vertical scan method, the current block may be partitioned in a vertical direction, thereby determining the sample information groups. Accordingly, the height of the sample information group is determined to be equal to the height of the current block and the width of the sample information group is determined to be equal to a value obtained by dividing the width of the sample information group by the number of sample information groups.

In performing of transform coefficient encoding/decoding of the current block, transform coefficient scanning may be performed using at least one of fixed transform coefficient scanning and adaptive transform coefficient scanning. In addition, the transform coefficient scanning method may also be applied to the transform coefficient group.

The transform coefficient scanning method of the current block may be applied to transform coefficient group scanning. In performing of transform coefficient group scanning, the transform coefficient group scanning method and order may be determined using the encoding information of the current block or the neighbor block. In the present disclosure, the transform coefficient group scanning may mean a search order of K (positive integer) transform coefficient groups present in the current block.

The encoding information may include at least one of the shape (square, vertical non-square, or horizontal non-square) of the block, the size (width, height or area), a prediction mode (intra, inter, IBC, palette, ISP), a quantization parameter QP, boundary information (picture, slice, tile, brick, CTU, CU, PU or TU), image components (R, G, B, Y, U, V), whether to perform a transform (transform, transform skip, secondary transform), or transform information (DCT2, DST7, DCT8).

According to an embodiment, the distribution characteristics of the transform coefficients of the transform result may vary according to the encoding information of the current block. Accordingly, coding performance may be improved by adaptively using the transform coefficient group scanning method and order suitable for the varying transform coefficient distribution characteristics.

According to an embodiment, arrangement of the transform coefficient groups of the current block may be determined according to the transform coefficient group information of the current block. Accordingly, coding performance may be improved by adaptively using the transform coefficient group scanning method and order according to arrangement of the transform coefficient groups.

According to an embodiment, the transform coefficient group scanning method may be one of diagonal scanning, reverse-diagonal scanning, horizontal scanning, vertical scanning, zigzag scanning, or reverse-zigzag scanning.

FIGS. 26 to 31 show diagonal scanning, reverse-diagonal scanning, horizontal scanning, vertical scanning, zigzag scanning, and reverse-zigzag scanning, respectively.

Figure 26:
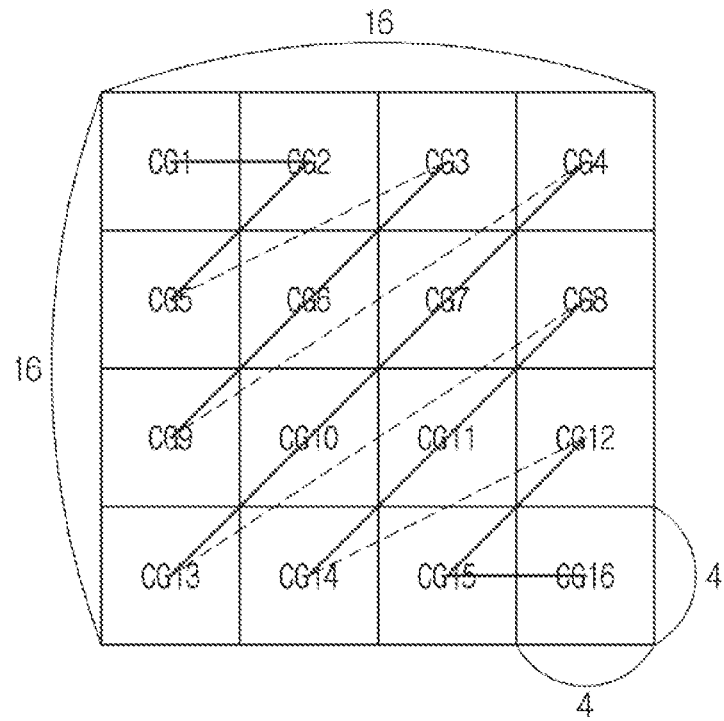
FIG. 26 is a view showing a scanning order according to diagonal scanning.

FIG. 26 is a view showing a scanning order according to diagonal scanning. According to diagonal scanning, the scanning order is determined according to the diagonal direction. According to the forward order of scanning from the top left transmission coefficient or the transform coefficient group, the top right transform coefficient or the transform coefficient group is scanned before the bottom left transform coefficient or the transform coefficient group. Conversely, according to the reverse order of scanning from the bottom right transform coefficient or the transform coefficient group, the bottom left transform coefficient or the transform coefficient group is scanned before the top right transform coefficient or the transform coefficient group.

Figure 27:
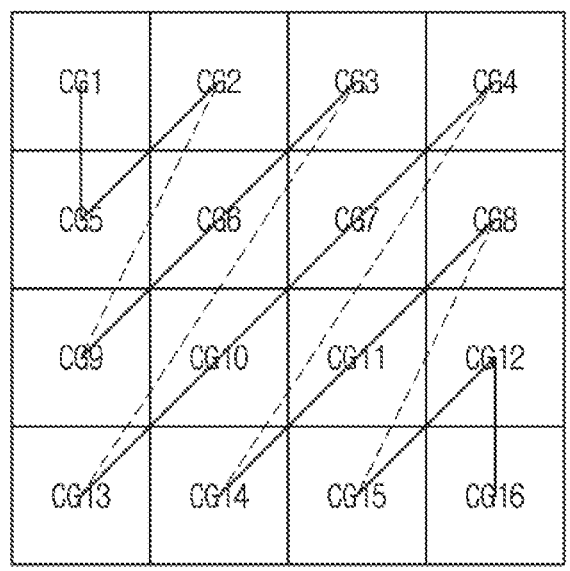
FIG. 27 is a view showing a scanning order according to reverse-diagonal scanning.

FIG. 27 is a view showing a scanning order according to reverse-diagonal scanning. According to reverse-diagonal scanning, the scanning order is determined according to the diagonal direction. According to the forward order of scanning from the top left transform coefficient or the transform coefficient group, the bottom left transform coefficient or the transform coefficient group is scanned before the top right transform coefficient or the transform coefficient group. Conversely, according to the reverse order of scanning from the bottom right transform coefficient or the transform coefficient group, the top right transform coefficient or the transform coefficient group is scanned before the bottom left transform coefficient or the transform coefficient group.

Figures 28, 29:
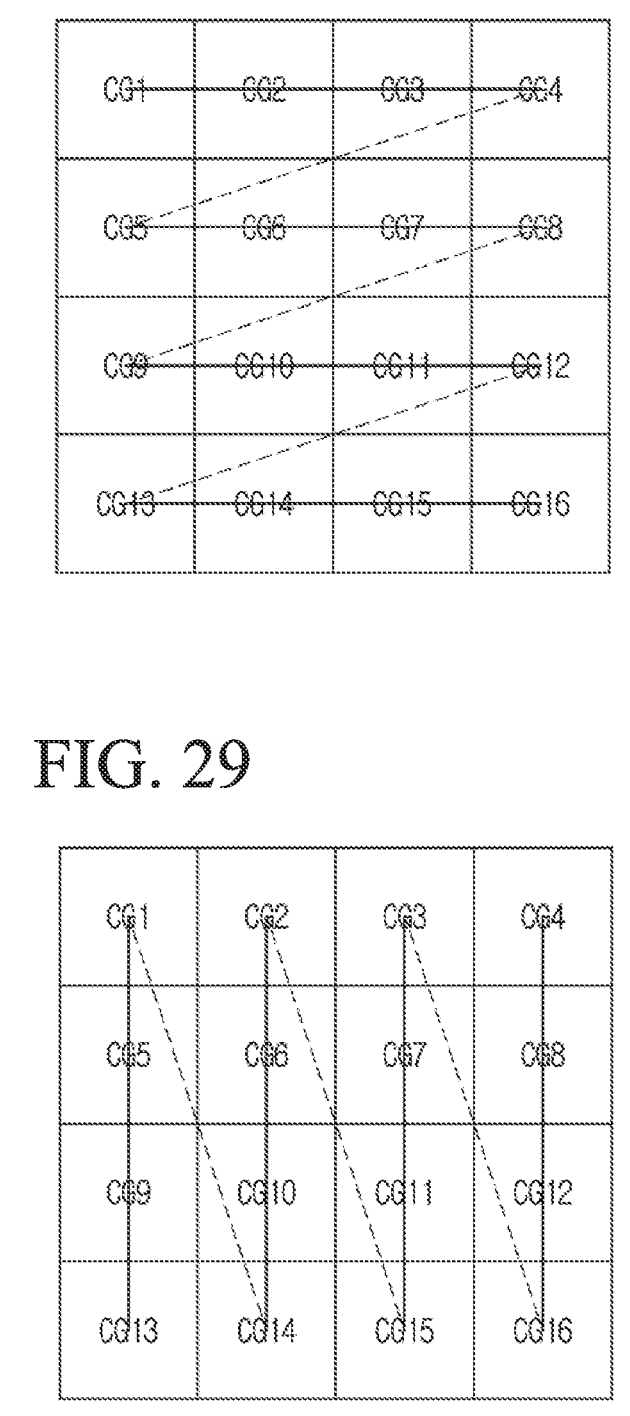

FIG. 28 is a view showing a scanning order according to horizontal scanning. According to horizontal scanning, the scanning order is determined according to the horizontal direction. According to the forward direction of scanning from the top left transform coefficient or the transform coefficient group, the left transform coefficient or the transform coefficient group is scanned before the right transform coefficient or the transform coefficient group. Conversely, according to the reverse order of scanning from the bottom right transform coefficient or the transform coefficient group, the right transform coefficient or the transform coefficient group is scanned before the left transform coefficient or the transform coefficient group.

FIG. 29 is a view showing a scanning order according to vertical scanning. According to vertical scanning, the scanning order is determined according to the vertical direction. According to the forward order of scanning from the top left transform coefficient or the transform coefficient group, the top transform coefficient or the transform coefficient group is scanned before the bottom transform coefficient or the transform coefficient group. Conversely, according to the reverse order of scanning from the bottom right transform coefficient or the transform coefficient group, the bottom transform coefficient or the transform coefficient group is scanned before the top transform coefficient or the transform coefficient group.

Figure 30:
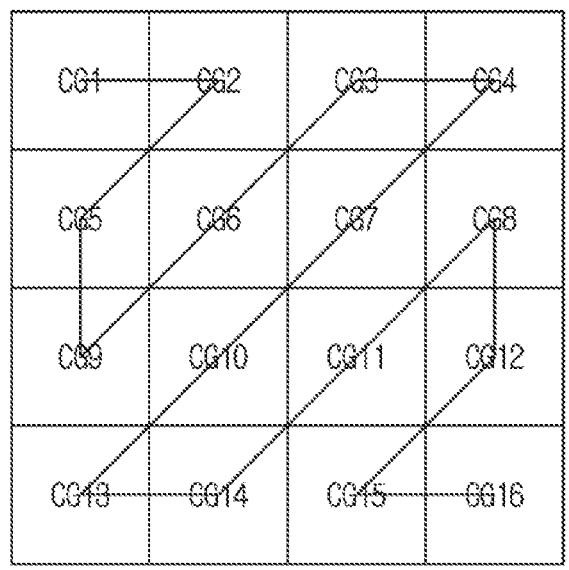
FIG. 30 is a view showing a scanning order according to zigzag scanning.

FIG. 30 is a view showing a scanning order according to zigzag scanning. According to zigzag scanning, the scanning order is determined according to the diagonal direction. However, as the scanning order, the top left direction or the bottom right direction is alternately applied for each diagonal array. According to the forward order of scanning from the top left transform coefficient or the transform coefficient group, for a second diagonal array (including CG2 and CG5), the top right transform coefficient or the transform coefficient group is scanned before the bottom left transform coefficient or the transform coefficient group. In addition, for a third diagonal array (including CG3, CG6 and CG9), the bottom left transform coefficient or the transform coefficient group is scanned before the top right transform coefficient or the transform coefficient group. Conversely, according to the reverse order of scanning from the bottom right transform coefficient or the transform coefficient group, for a second diagonal array (including CG2 and CG5), the bottom left transform coefficient or the transform coefficient group is scanned before the top right transform coefficient or the transform coefficient group. In addition, for a third diagonal array (including CG3, CG6 and CG9), the top right transform coefficient or the transform coefficient group is scanned before the bottom left transform coefficient or the transform coefficient group.

Figure 31:
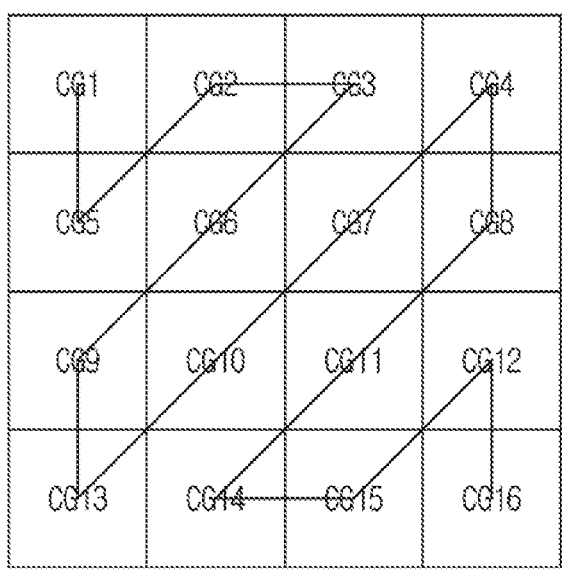
FIG. 31 is a view showing a scanning order according to reverse-zigzag scanning.

FIG. 31 is a view showing a scanning order according to reverse-zigzag scanning. According to reverse-zigzag scanning, the scanning order is determined according to the diagonal direction. However, as the scanning order, the bottom right direction or the top left direction is alternately applied for each diagonal array. According to the forward order of scanning from the top left transform coefficient or the transform coefficient group, for a second diagonal array (including CG2 and CG5), the bottom left transform coefficient or the transform coefficient group is scanned before the top right transform coefficient or the transform coefficient group. In addition, for a third diagonal array (including CG3, CG6 and CG9), the top right transform coefficient or the transform coefficient group is scanned before the bottom left transform coefficient or the transform coefficient group. Conversely, according to the reverse order of scanning from the bottom right transform coefficient or the transform coefficient group, for a second diagonal array (including CG2 and CG5), the top right transform coefficient or the transform coefficient group is scanned before the bottom left transform coefficient or the transform coefficient group. In addition, for a third diagonal array (including CG3, CG6 and CG9), the bottom left transform coefficient or the transform coefficient group is scanned before the top right transform coefficient or the transform coefficient group.

In FIGS. 26 to 31, the scanning order has been described based on the block having a size of 4×4. However, diagonal scanning, reverse-diagonal scanning, horizontal scanning, vertical scanning, zigzag scanning, and reverse-zigzag scanning described in FIGS. 26 to 31 are applicable to blocks having sizes other than a size of 4×4.

According to an embodiment, the transform coefficient group scanning order may be forward order or reverse order. For example, the forward order is an order from CG1 to CG16 in FIGS. 26 to 31. In addition, the reverse order is an order from CG16 to CG1 in FIGS. 26 to 31.

According to an embodiment, the transform coefficient group scanning method and the order determination method may be applied when the transform coefficient scanning performing method and order in the transform coefficient group are determined.

According to an embodiment, the transform coefficient group scanning method and order of the current block may be fixed to one method and one order. For example, the transform coefficient group scanning method may be diagonal scanning and the order may be a reverse order. For example, the transform coefficient group scanning method may be reverse-diagonal scanning and the order may be a reverse order.

According to an embodiment, the transform coefficient group scanning method and order may be adaptively determined according to the shape of the current block. For example, if the current block has a vertical non-square shape, the transform coefficient group scanning may be reverse-diagonal scanning and the order may be a reverse order. Alternatively, if the current block has a vertical non-square shape, the transform coefficient group scanning may be vertical scanning and the order may be a reverse order. Alternatively, if the current block has a vertical non-square shape, the transform coefficient group scanning may be reverse-zigzag scanning and the order may be a reverse order. For example, if the current block has a horizontal non-square shape, the transform coefficient group scanning may be diagonal scanning and the order may be a reverse order. Alternatively, if the current block has a horizontal non-square shape, the transform coefficient group scanning may be horizontal scanning and the order may be a reverse order. Alternatively, if the current block has a horizontal non-square shape, the transform coefficient group scanning may be zigzag scanning and the order may be a reverse order.

According to an embodiment, the transform coefficient group scanning method and order may be determined according to the difference between the width and height of the current block. For example, when the current block satisfies the condition of "(width)>α*(height)", the transform coefficient group scanning may be diagonal scanning and the order may be a reverse order. Alternatively, when the current block satisfies the condition of "(width)>α*(height)", the transform coefficient group scanning may be horizontal scanning and the order may be a reverse order. For example, when the current block satisfies the condition of "(height)>=α*(width)", the transform coefficient group scanning may be reverse-diagonal scanning and the order may be a reverse order. Alternatively, when the current block satisfies the condition of "(height)>=α*(width)", the transform coefficient group scanning may be vertical scanning and the order may be a reverse order. For example, when the current block does not satisfy at least one of the conditions ("(width)>α*(height)" or "(height)>=α*(width)"), the transform coefficient group scanning method may be diagonal scanning and the order may be a reverse order. Alternatively, when the current block does not satisfy at least one of the above conditions, the transform coefficient group scanning method may be reverse-diagonal scanning and the order may be a reverse order. In the present disclosure, α may be a predefined arbitrary constant or a variable adaptively determined according to the encoding information of the current block or a neighbor block. α may be an integer or a fraction. For example, α may be 2 (integer).

According to an embodiment, the transform coefficient group scanning method and order may be determined according to the area of the current block.

According to an embodiment, the transform coefficient group scanning method and order may be determined depending on whether to transform the current block. For example, when the current block is in a transform skip mode, the transform coefficient group scanning method may be reverse-diagonal scanning and the order may be a forward order. Alternatively, when the current block is in a transform skip mode, the transform coefficient group scanning method may be zigzag scanning and the order may be a reverse order. For example, when a secondary transform is applied to the current block, the transform coefficient group scanning method may be reverse-diagonal scanning and the order may be a reverse order.

According to an embodiment, the transform coefficient group scanning method and order may be adaptively determined according to the prediction mode of the current block. For example, when the current block is a sub-coding block partitioned due to the vertical ISP mode, the transform coefficient group scanning method may be vertical scanning and the order may be a reverse order. Alternatively, when the current block is a sub-coding block partitioned due to the vertical ISP mode, the transform coefficient group scanning method may be reverse-diagonal scanning and the order may be a reverse order. For example, when the current block is a sub-coding block partitioned due to the horizontal ISP mode, the transform coefficient group scanning method may be horizontal scanning and the order may be a reverse order. Alternatively, when the current block is a sub-coding block partitioned due to the horizontal ISP mode, the transform coefficient group scanning method may be diagonal scanning and the order may be a reverse order.

According to an embodiment, the transform coefficient group scanning may be performed with respect to only a region obtained by excluding the zero-out region from the current block. For example, as shown in FIGS. 32 to 35, the transform coefficient group scanning may be performed.

Figure 32:
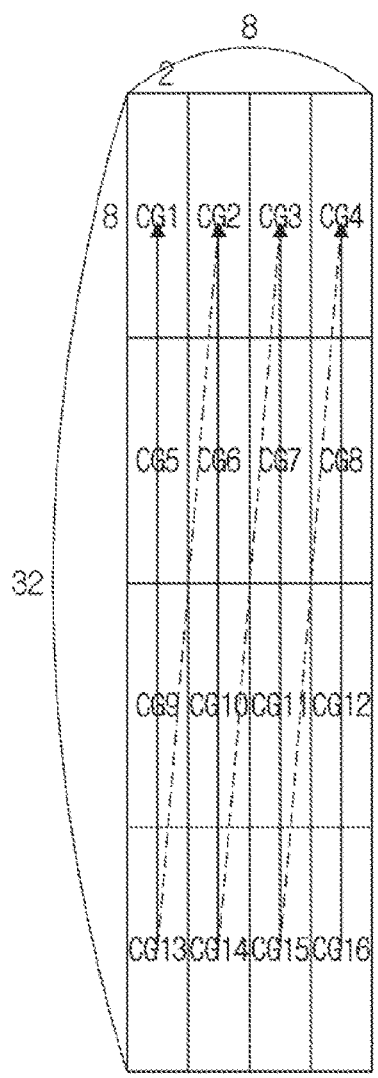
FIG. 32 is a view showing an embodiment of a scanning method of a transform coefficient group of a current block having a vertical non-square shape.

FIG. 32 is a view showing an embodiment of a scanning method of a transform coefficient group of a current block having a vertical non-square shape. The size of the current block is 8×32. In addition, all the sizes of the transform coefficient groups included in the current block are 2×8. As shown in FIG. 32, if the current block has a vertical non-square shape, the transform coefficient groups may also be determined to have a vertical non-square shape. In addition, if the current block has a vertical non-square shape, the transform coefficient groups may be scanned according to vertical scanning.

Figure 33:
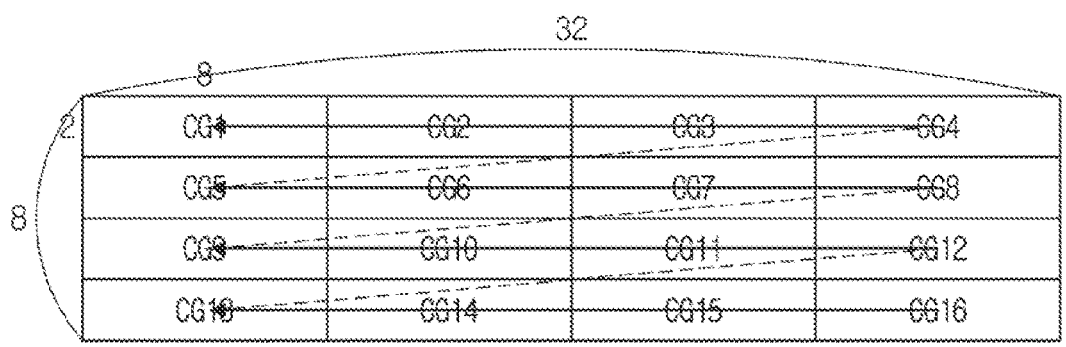
FIG. 33 is a view showing an embodiment of a scanning method of a transform coefficient group of a current block having a horizontal non-square shape.

FIG. 33 is a view showing an embodiment of a scanning method of a transform coefficient group of a current block having a horizontal non-square shape. The size of the current block is 32×8. In addition, all the sizes of the transform coefficient groups included in the current block are 8×2. As shown in FIG. 33, when the current block has a horizontal non-square shape, the transform coefficient groups may also be determined to have a horizontal non-square shape. In addition, when the current block has a horizontal non-square shape, the transform coefficient groups may be scanned according to horizontal scanning.

FIG. 34 is a view showing an embodiment of a scanning method of a transform coefficient group of a current block having a horizontal non-square shape. The size of the current block is 16×8. In addition, all the sizes of the transform coefficient groups included in the current block are 4×4. In case of FIG. 34, if the current block has a horizontal non-square shape, the transform coefficient groups may be scanned according to horizontal scanning. However, even if the current block has a horizontal non-square shape, the transform coefficient groups may be determined to have a square shape.

FIG. 35 is a view showing an embodiment of a scanning method of a transform coefficient group of a current block having a vertical non-square shape. The size of the current block is 8×16. In addition, all the sizes of the transform coefficient groups included in the current block are 4×4. In case of FIG. 35, if the current block has a vertical non-square shape, the transform coefficient groups may be scanned according to vertical scanning. However, even if the current block has a vertical non-square shape, the transform coefficient groups may be determined to have a square shape.

The shape and scan order of the transform coefficient groups of FIGS. 32 to 35 are merely examples and the transform coefficient group may be set to have different shape and scan orders according to the embodiment.

According to an embodiment, in performing of transform coefficient scanning of the current block, fixed transform coefficient scanning may be used.

According to an embodiment, the same transform coefficient scanning method is applicable to at least one unit such as a current block/brick/slice/tile/picture/sequence. For example, at least one of the scanning methods described with reference to FIGS. 25 to 30 is applicable to the transform coefficients of the current transform coefficient group.

According to an embodiment, adaptive transform coefficient scanning is applicable to the transform coefficient group. Different scanning methods may be applied to transform coefficient groups, respectively. The transform coefficient scanning method applied to the transform coefficient group may be equal to the transform coefficient group scanning method described in the present disclosure or may be a modification of the transform coefficient group scanning method.

According to an embodiment, the transform coefficient groups in the current block may have different scanning methods. In performing of transform coefficient scanning, the transform coefficient scanning method may vary based on coding parameters such as a quantization parameter, a transform method, a coding mode, an intra prediction mode, an inter prediction mode, a transform coefficient value and the size/shape of the current block. For example, if a DC mode or a PLANAR mode is applied to the current block, diagonal scanning is applicable to transform coefficient scanning. Alternatively, if a horizontal prediction mode is applied to the current block, vertical scanning is applicable to transform coefficient scanning. Alternatively, if a vertical prediction mode is applied to the current block, horizontal scanning is applicable to transform coefficient scanning. For example, if the current block is a subblock due to vertical intra sub partitioning, vertical scanning is applicable to transform coefficient scanning. For example, if the current block is a subblock due to horizontal intra sub partitioning, horizontal scanning is applicable to transform coefficient scanning.

According to an embodiment, a transform coefficient scanning candidate list having a plurality of candidates may be constructed in units of at least one of a picture, a slice, a coding block, or a transform coefficient group. The transform coefficient scanning candidate list may be differently constructed based on at least one of a coding mode, a transform method, an inter prediction mode or an intra prediction mode. A scanning method optimized for the current coding block or transform coefficient group may be selected from the transform coefficient scanning candidate list. In addition, index information indicating the optimized scanning method may be generated in an encoder and decoded in a decoder.

According to an embodiment, in performing of transform coefficient scanning, a transform coefficient and a transform coefficient group included in a non-zero-out region except for the zero-out region may be scanned.

According to an embodiment, in performing of transform coefficient encoding/decoding of the current block, transform coefficient binarization may be performed using at least one of significant coefficient flag binarization, transform coefficient sign indicator binarization or transform coefficient absolute value binarization. The binarization is applicable to entropy encoding/decoding.

According to an embodiment, a significant coefficient flag may be encoded/decoded in transform coefficient units or transform coefficient group units of the current block. The significant coefficient flag may indicate presence/absence of a non-zero transform coefficient. In binarization of the significant coefficient flag of the current block, a significant coefficient flag may be encoded/decoded in transform coefficient units. The significant coefficient flag of the transform coefficient unit may indicate "1" when the value of the transform coefficient in the transform coefficient group is not 0 and indicate "0" when the value of the transform coefficient in the transform coefficient group is 0.

According to an embodiment, the significant coefficient group flag may be encoded/decoded in transform coefficient group units of the current block. The significant coefficient group flag of the transform coefficient group unit may indicate "1" if a transform coefficient having a non-zero value is present in the transform coefficient group. Conversely, the significant coefficient group flag of the transform coefficient group unit may indicate "0" if a transform coefficient having a non-zero value is not present in the transform coefficient group.

According to an embodiment, if the significant coefficient group flag of the transform coefficient group unit is "0", the value of the transform coefficient included in the transform coefficient group is determined as 0. Accordingly, if the significant coefficient group flag of the transform coefficient group unit is "0", the significant coefficient flag of the transform coefficient included in the group may not be encoded/decoded.

FIG. 36 is a view showing a significant coefficient flag and a significant coefficient group flag of a current block including a transform coefficient group.

When the size of the current block is 8×8 and the size of the transform coefficient groups is 4×4, as shown in FIG. 36, the significant coefficient group flags of the top left, bottom left and top right transform coefficient groups may be determined as 1. In addition, the significant coefficient group flag of the bottom right transform coefficient group may be determined as 0. The significant coefficient flag of the transform coefficient included in the transform coefficient groups is determined depending on whether the value of the transform coefficient is 0. In addition, since all the values of the transform coefficients included in the bottom right transform coefficient group are 0, the significant coefficient flag of the transform coefficient is not signaled.

According to an embodiment, the transform coefficient groups and transform coefficients included in the zero-out region predefined by the encoder/decoder, transform coefficient group unit presence indicators, and transform coefficient unit presence indicators may be omitted.

According to an embodiment, if binarization (entropy encoding/decoding) of the transform coefficient group unit presence indicator or the transform coefficient unit presence indicator is performed, entropy encoding/decoding of the significant coefficient group flag or the transform significant coefficient flag may be performed based on different probability information (context) for each transform coefficient group.

According to an embodiment, in performing of transform coefficient sign binarization of the current block, at least one of a transform coefficient sign indicator, a transform coefficient sign hiding or transform coefficient sign prediction may be used.

According to an embodiment, in coding/decoding of the transform coefficient sign indicator of the current block, a transform coefficient sign indicator may be used. For example, the transform coefficient sign indicator may be determined as "1" if the transform coefficient is a negative number (−) and may be determined as "0" if the transform coefficient is a positive number (+). Conversely, the transform coefficient sign indicator may be determined as "0" if the transform coefficient is a negative number (−) and may be determined as "1" if the transform coefficient is a positive number (+). For example, when the significant coefficient flag in the transform coefficient unit or the significant coefficient group flag in the transform coefficient group unit is "0", the coefficient sign indicator may not be encoded/decoded.

According to an embodiment, in binarization of the transform coefficient sign indicator of the current block, transform coefficient sign hiding is applicable. Transform coefficient sign hiding may be performed in the transform coefficient group units.

According to an embodiment, transform coefficient hiding may be to derive N (N being a positive integer) pieces of transform coefficient sign information according to the absolute value of the transform coefficient. For example, transform coefficient sign hiding is applicable to only the first transform coefficient of the current block or the transform coefficient group. For example, when the level of the first transform coefficient is even, the sign of the first transform coefficient may be determined as +. In addition, when the level of the first transform coefficient is odd, the sign of the transform coefficient may be determined as −. Conversely, when the level of the first transform coefficient is even, the sign of the first transform coefficient may be determined as −. In addition, when the level of the first transform coefficient is odd, the sign of the transform coefficient may be determined as +. In addition, for example, when the sum of the transform coefficients of the transform coefficient group is even, the sign of the first non-zero transform coefficient may be +. For example, when the sum of the transform coefficients of the transform coefficient group is even, the sign of the first non-zero transform coefficient may be −.

According to an embodiment, whether to apply transform coefficient hiding may be determined according to a location difference between the first transform coefficient and the last transform coefficient among non-zero transform coefficients. For example, when the location difference between the first transform coefficient and the last transform coefficient is equal to or less than a predetermined value, transform coefficient hiding may not be applied. Conversely, when the location difference between the first transform coefficient and the last transform coefficient is greater than a predetermined value, transform coefficient hiding may be applied. The predetermined value may be an arbitrary positive integer. For example, the predetermined value may be 3.

According to an embodiment, in binarization of the transform coefficient sign indicator of the current block, transform coefficient sign prediction may be used. Transform coefficient sign prediction may be used. Transform coefficient sign prediction may be performed in transform coefficient group units.

According to an embodiment, transform coefficient sign prediction may predict the sign of N positive-integer non-zero transform coefficients in the transform coefficient group, and the transform coefficient sign indicator may indicate "1" when an actual sign and a prediction sign are the same and indicate "0" when the actual sign and the prediction sign are different. The prediction sign of the transform coefficient may be determined by a combination having the most optimal cost among N coefficient sign combination (2N combinations) to be predicted. The cost of the sign combinations may be determined by similarity between data obtained by reversely transforming the current transform coefficient group through the corresponding combination and a neighbor reconstructed image.

According to an embodiment, in performing of encoding/decoding of the absolute value of the transform coefficient of the current block, at least one of an absolute value comparison based transform coefficient binarization method, an exponential scale absolute value comparison based transform coefficient binarization method or a residual transform coefficient absolute value binarization method is applicable.

According to an embodiment, in transform coefficient encoding/decoding of the current block, absolute value comparison-based transform coefficient binarization may be performed. Absolute value comparison-based transform coefficient binarization may be performed in transform coefficient group units. Absolute value comparison-based transform coefficient binarization may be performed if the significant coefficient flag indicates 1.

According to an embodiment absolute value comparison-based transform coefficient binarization may be performed using Equation 1 below and a positive integer N.

$$\text{abs}(coeff.) > K, K = \{1, \ldots, N\} \qquad \text{Equation 1}$$

For example, if N is 2, as shown in Table 6, comparison-based transform coefficient binarization may be performed according to the transform coefficient value. Absolute value comparison-based transform coefficient binarization may be performed with respect to only I (I being a positive integer) transform coefficients in scanning order. Absolute value comparison-based transform coefficient binarization may be performed with respect to only J (J being a positive integer) transform coefficients in reverse-scanning order.

TABLE 6

| abs(coeff.) | 10 | 9 | 8 | 7 | 6 | 5 | 4 | 3 | 2 | 1 |
|---|---|---|---|---|---|---|---|---|---|---|
| Significant coefficient flag | 1 | 1 | 1 | 1 | 1 | 1 | 1 | 1 | 1 | 1 |
| abs(coeff.) > 1 | 1 | 1 | 1 | 1 | 1 | 1 | 1 | 1 | 1 | 0 |
| abs(coeff.) > 2 | 1 | 1 | 1 | 1 | 1 | 1 | 1 | 1 | 0 | |
| remainder | 7 | 6 | 5 | 4 | 3 | 2 | 1 | 0 | | |

According to an embodiment, in transform coefficient encoding/decoding of the current block, exponential scale absolute value comparison-based transform coefficient binarization may be performed. Exponential scale absolute value comparison-based transform coefficient binarization may be performed in transform coefficient group units. Exponential scale absolute value comparison-based transform coefficient binarization may be performed if the significant coefficient flag is 1.

According to an embodiment, exponential scale absolute value comparison-based transform coefficient binarization may be performed using Equation 2 below and positive integers a and N.

$$abs(coeff.) \geq a^K, K = \{1, \ldots, N\} \quad \text{Equation 2}$$

For example, if a is 2 and N is 3, as shown in Table 7, exponential scale comparison-based transform coefficient binarization may be performed according to the transform coefficient value. Exponential scale absolute value comparison-based transform coefficient binarization may be performed with respect to only I (I being a positive integer) transform coefficients in scanning order. Exponential scale absolute value comparison-based transform coefficient binarization may be performed with respect to only J (J being a positive integer) transform coefficients in reverse-scanning order.

TABLE 7

| abs(coeff.) | 10 | 9 | 8 | 7 | 6 | 5 | 4 | 3 | 2 | 1 |
|---|---|---|---|---|---|---|---|---|---|---|
| Significant coefficient flag | 1 | 1 | 1 | 1 | 1 | 1 | 1 | 1 | 1 | 1 |
| abs(coeff.) ≥ 2 | 1 | 1 | 1 | 1 | 1 | 1 | 1 | 1 | 1 | 0 |
| abs(coeff.) ≥ 4 | 1 | 1 | 1 | 1 | 1 | 1 | 1 | 0 | 0 | |
| abs(coeff.) ≥ 8 | 1 | 1 | 1 | 0 | 0 | 0 | 0 | | | |
| remainder | 2 | 1 | 0 | 3 | 2 | 1 | 0 | 1 | 0 | |

According to an embodiment, a transform coefficient encoding and decoding method may be determined in transform coefficient units based on coding parameters. The coding parameters may include at least one of a slice type, a coding mode, an intra prediction mode, an inter prediction mode, a transform coefficient value, or a size/shape of a current block.

According to an embodiment, exponential scale absolute value comparison binarization is applicable to a low-frequency transform coefficient. In addition, absolute value comparison-based transform coefficient binarization is applicable to a high-frequency transform coefficient.

According to an embodiment, exponential scale absolute value comparison binarization may be performed with respect to a transform coefficient having a low quantization parameter. In addition, absolute value comparison-based transform coefficient binarization may be performed with respect to a transform coefficient having a high quantization parameter.

According to an embodiment, if an intra prediction mode is applied to the current block, exponential scale absolute value comparison binarization is applicable to the transform coefficient of the current block. In addition, if an inter prediction mode is applied to the current block, absolute value comparison-based transform coefficient binarization is applicable to the transform coefficient of the current block.

According to an embodiment, when the size of the current block is N×M, if min(N,M) or max(N, M) is greater than an arbitrary positive-integer threshold K, exponential scale absolute value comparison binarization is applicable to the transform coefficient of the current block. If not, absolute value comparison-based transform coefficient binarization is applicable to the transform coefficient of the current block. min(N,M) indicates the minimum value between N and M. In addition, max(N, M) indicates the maximum value between N and M.

In Tables 6 and 7, the abs(coeff.) value indicates the absolute value of the transform coefficient level. The transform coefficient level is a result of transform and quantization. In order to determine abs(coeff.), a significant coefficient flag indicating that the transform coefficient level is not 0 may be included in a bitstream. An indicator indicating whether the transform coefficient level is greater than 1 may be included in the bitstream. In addition, an indicator indicating whether the transform coefficient level is greater than 2 may be included in the bitstream. In addition, an indicator indicating whether the transform coefficient level is greater than 4 may be included in the bitstream. In addition, an indicator indicating whether the transform coefficient level is greater than 8 may be included in the bitstream.

According to an embodiment, when the significant coefficient flag indicates that the transform coefficient is not 0, an indicator indicating whether the transform coefficient level is greater than 1 may be included in the bitstream. In addition, when the significant coefficient flag indicates that the transform coefficient is not 0, an indicator indicating whether the transform coefficient level is greater than 2 may be included in the bitstream. In addition, when the significant coefficient flag indicates that the transform coefficient is not 0, an indicator indicating whether the transform coefficient level is greater than 4 may be included in the bitstream.

According to an embodiment, when the indicator indicating whether the transform coefficient level is greater than 1 indicates that the transform coefficient level is greater than 1, the indicator indicating whether the transform coefficient level is greater than 3 may be included in the bitstream. In addition, along with the indicator indicating whether the transform coefficient level is greater than 3, equivalency information for transform coefficient level determination may be included in the bitstream. The equivalency information may indicate the level of the current transform coefficient between 2 and 3 when the transform coefficient level is less than 3.

According to an embodiment, when the indicator indicating that the transform coefficient level is greater than 2 indicates that the transform coefficient level is greater than 2, the indicator indicating whether the transform coefficient level is greater than 4 may be included in the bitstream. In addition, when the indicator indicating whether the transform coefficient level is greater than 4 indicates that the transform coefficient level is greater than 4, the indicator indicating whether the transform coefficient level is greater than 8 may be included in the bitstream.

According to an embodiment, when the indicator indicating whether the transform coefficient level is greater than 4 indicates that the transform coefficient level is less than 4, the indicator indicating the transform coefficient level between 2 and 3 may be included in the bitstream. When the indicator indicating whether the transform coefficient level is greater than 8 indicates that the transform coefficient level is less than 8, the indicator indicating that the transform coefficient level among 4 to 7 may be included in the bitstream.

According to an embodiment, a sum of the number of significant coefficient flags and the number of flags indicating whether the transform coefficient level is greater than N (N being a positive integer) may be limited to be less than a predetermined number. Alternatively, a sum of the number of significant coefficient flags, the number of indicators indicating whether the transform coefficient level is greater than N (N being a positive integer) and the number of pieces of equivalency information may be limited to be less than a predetermined number. The number of indicators may be determined according to the size of the current block. For example, the number of indicators may be determined in proportion to the number of samples included in the current block. In a specific example, the number of indicators may be determined as 1.5 times, 1.75 times, 2 times, 2.5 times, 3 times, etc. of the number of samples included in the current block.

According to an embodiment, in transform coefficient encoding/decoding of the current block, residual transform coefficient level binarization may be performed. When the transform coefficient level is greater than a predetermined value, the residual transform coefficient level indicates a difference between the predetermined value and the transform coefficient level.

According to an embodiment, residual transform coefficient level binarization may be performed according to the Truncated Rice binarization method. In addition, residual transform coefficient level binarization may be performed according to the K-th order Exp_Golomb binarization method. In addition, residual transform coefficient level binarization may be performed according to the limited K-th order Exp_Golomb binarization method. In addition, residual transform coefficient level binarization may be performed according to the Fixed-length binarization method. In addition, residual transform coefficient level binarization may be performed according to the unary binarization method. In addition, residual transform coefficient level binarization may be performed according to the Truncated Unary binarization method.

According to an embodiment, different binarization methods may be used according to the residual transform coefficient level. For example, the truncated unary binarization method may be applied to a transform coefficient having a residual transform coefficient level equal to or less than a positive integer c. In addition, the K-th order Exp_Golomb binarization method is applicable to a transform coefficient having a residual transform coefficient level exceeding the positive integer c.

According to an embodiment, different binarization methods may be used according to the scanning order. For example, when binarization of the residual transform coefficient level is performed according to the K-th order Exp_Golomb binarization method, the K value may be determined according the scanning order of the current block or the current transform coefficient group.

Figure 37:
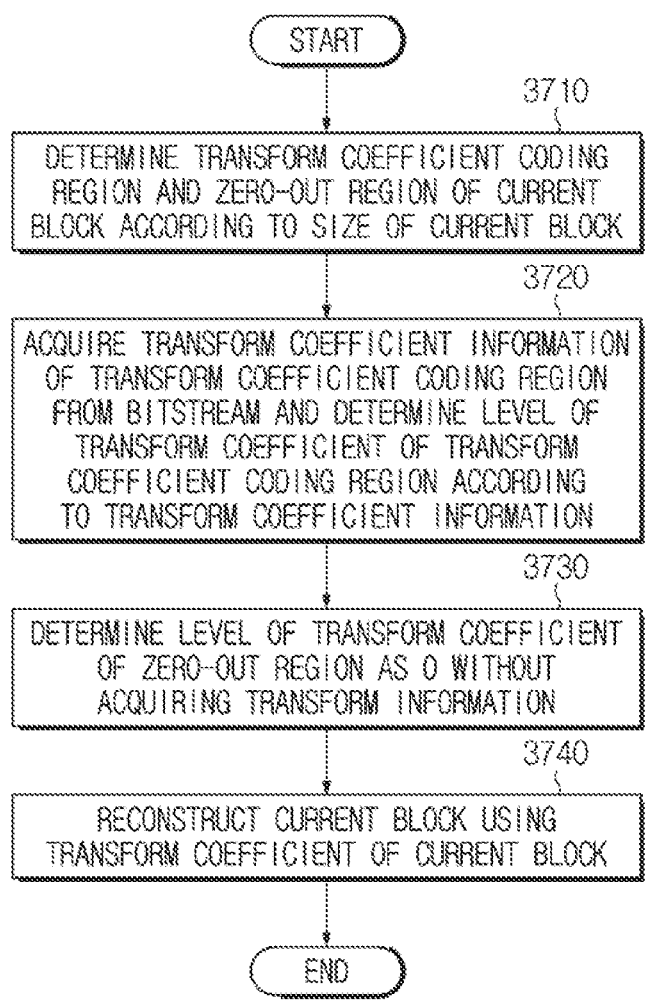
FIG. 37 is a view showing an embodiment of a video decoding method according to a transform coefficient coding region and a zero-out area of a current block.

FIG. 37 is a view showing an embodiment of a video decoding method according to a transform coefficient coding region and a zero-out area of a current block.

In step 3710, the transform coefficient coding region and the zero-out region of the current block are determined according to the size of the current block.

According to an embodiment, a zero-out width threshold and zero-out height threshold for distinguishing between the transform coefficient coding region and the zero-out region may be determined. The transform coefficient coding region and the zero-out region may be determined according to the zero-out width threshold and the zero-out height threshold.

According to an embodiment, a transform coefficient having an x-coordinate greater than the zero-out width threshold may be included in the zero-out region. In addition, a transform coefficient having a y-coordinate greater than the zero-out height threshold may be included in the zero-out region. A transform coefficient having an x-coordinate equal to or less than the zero-out width threshold and having a y-coordinate equal to or less than the zero-out height threshold may be included in the transform coefficient coding region.

According to an embodiment, the zero-out width threshold and the zero-out height threshold may be determined according to the larger value of the height and width of the current block. For example, when the larger value of the height and width of the current block is equal to or less 32, the zero-out width threshold and the zero-out height threshold are determined as 16, and, when the larger value of the height and width of the current block is equal to or greater than 64, the zero-out width threshold and the zero-out height threshold may be determined as 32.

According to an embodiment, when the height of the current block is less than 64 and the width of the current block is 32, the zero-out width threshold may be determined as 16. In addition, when the height of the current block is equal to or greater than 64 or the width of the current block is not 32, the zero-out width threshold may be determined as the smaller value of the width of the current block and 32.

According to an embodiment, when the height of the current block is 32 and the width of the current block is less than 64, the zero-out height threshold may be determined as 16. In addition, when the height of the current block is not 32 or the width of the current block is equal to or greater than 64, the zero-out height threshold may be determined as the smaller value of the height of the current block and 32.

According to an embodiment, when the size of the current block is equal to or less than a first reference size, it may be determined that the current block is not included in the zero-out region. For example, the first reference size may be 16×16.

According to an embodiment, when the size of the current block is greater than a second reference size, the transform coefficient coding region of the current block may be determined according to the second reference size. In addition, the zero-out region may be determined as a region obtained by excluding the transform coefficient coding region from the current block. For example, the second reference size may be 32×32.

In step 3720, the transform coefficient information of the transform coefficient coding region is acquired from a bitstream, and the level of the transform coefficient of the transform coefficient coding region is determined according to the transform coefficient information.

In step 3730, the level of the transform coefficient of the zero-out region is determined as 0, without acquiring the transform coefficient information.

In step 3740, the current block is reconstructed using the transform coefficient of the current block.

Figure 38:
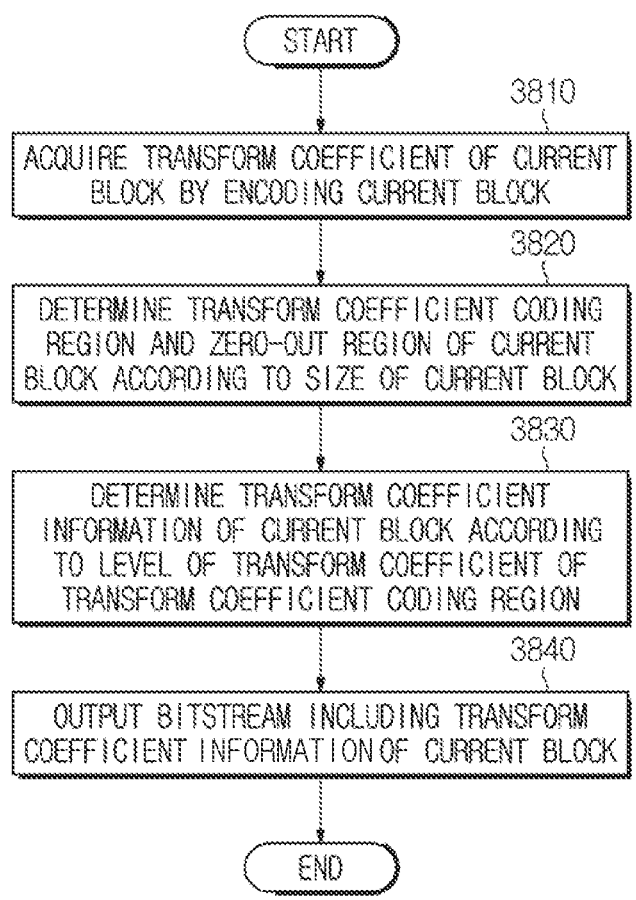
FIG. 38 is a view showing an embodiment of a video encoding method according to a transform coefficient coding region and a zeroing-out region of a current block.

FIG. 38 is a view showing an embodiment of a video encoding method according to a transform coefficient coding region and a zeroing-out region of a current block.

In step 3810, the transform coefficient of the current block is acquired by encoding the current block.

In step 3820, the transform coefficient coding region and the zero-out region of the current block are determined according to the size of the current block.

According to an embodiment, the zero-out width threshold, and the zero-out height threshold for distinguishing between the transform coefficient coding region and the zero-out region may be determined. The transform coefficient coding region and the zero-out region may be determined according to the zero-out width threshold and the zero-out height threshold.

According to an embodiment, a transform coefficient having an x-coordinate greater than the zero-out width threshold may be included in the zero-out region. In addition, a transform coefficient having a y-coordinate greater than the zero-out height threshold may be included in the zero-out region. A transform coefficient having an x-coordinate equal to or less than the zero-out width threshold and a y-coordinate equal to or less than the zero-out height threshold may be included in the transform coefficient coding region.

According to an embodiment, the zero-out width threshold and the zero-out height threshold may be determined according to the larger value of the height and width of the current block. For example, when the larger value of the height and width of the current block is equal to or less than 32, the zero-out width threshold and the zero-out height threshold may be determined as 16 and, when the larger value of the height and width of the current block is equal to or greater than 64, the zero-out width threshold and the zero-out height threshold may be determined as 32.

According to an embodiment, when the height of the current block is less than 64 and the width of the current block is 32, the zero-out width threshold may be determined as 16. In addition, when the height of the current block is equal to or greater than 64 or the width of the current block is not 32, the zero-out width threshold may be determined as the smaller value of the width of the current block and 32.

According to an embodiment, when the height of the current block is 32 and the width of the current block is less than 64, the zero-out height threshold may be determined as 16. In addition, when the height of the current block is not 32 or the width of the current block is equal to or greater than 64, the zero-out height threshold may be determined as the smaller value of the height of the current block and 32.

According to an embodiment, when the size of the current block is equal to or less than a first reference size, it may be determined that the current block is not included in the zero-out region. For example, the first reference size may be 16×16.

According to an embodiment, when the size of the current block is greater than the second reference size, the transform coefficient coding region of the current block may be determined according to the second reference size. In addition, the zero-out region may be determined as a region obtained by excluding the transform coefficient coding region from the current block. For example, the second reference size may be 32×32.

In step 3830, the transform coefficient information of the current block is determined according to the level of the transform coefficient of the transform coefficient coding region. In addition, the transform coefficient information of the transform coefficient of the zero-out region is omitted.

In step 3840, a bitstream including the transform coefficient information of the current block is output.

The embodiment of FIG. 38 is merely an example and each step of FIG. 38 may be easily modified by those skilled in the art. In addition, each configuration of FIG. 38 may be omitted or replaced with another configuration. The video encoding method of FIG. 38 may be performed in the encoder of FIG. 1. In addition, one or more processors may perform commands for implementing the video encoding method of FIG. 38. A program product including the commands for implementing the video encoding method of FIG. 38 may be stored in a memory device or distributed online.

Figure 39:
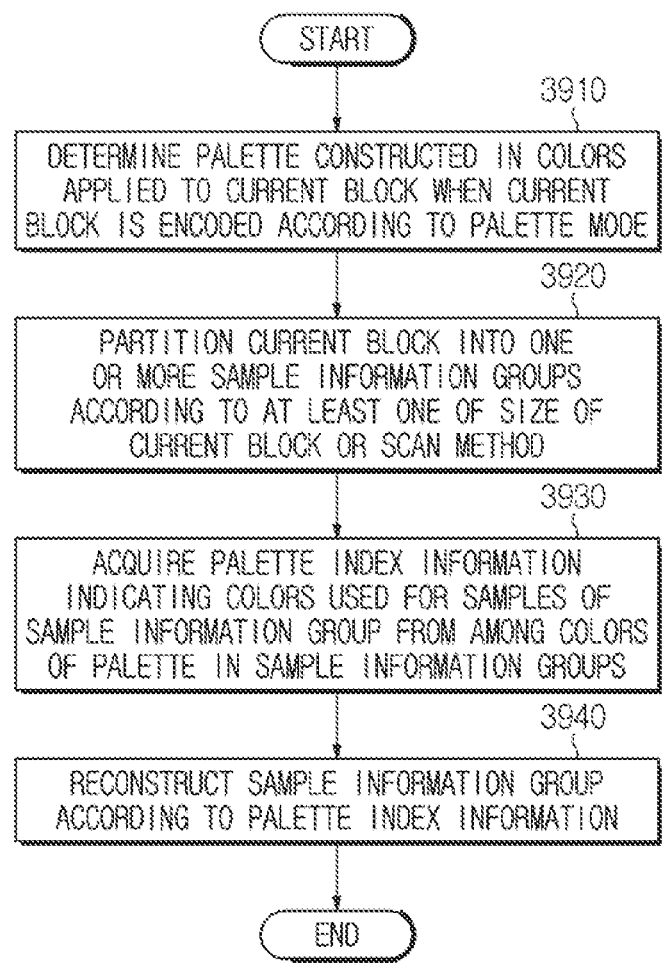
FIG. 39 is a view showing an embodiment of a video decoding method of partitioning a current block into sample information groups in a palette mode.

FIG. 39 is a view showing an embodiment of a video decoding method of partitioning a current block into sample information groups in a palette mode.

In step 3910, when the current block is encoded according to the palette mode, a palette constructed in colors applied to the current block is determined.

In step 3920, the current block is partitioned into one or more sample information groups according to at least one of the size of the current block or a scan method.

According to an embodiment, the number of sample information groups may be determined according to the size of the current block. In addition, the current block may be partitioned such that the current block includes the determined number of sample information groups. For example, the number of sample information groups of the current block may be determined such that 16 samples are included in the sample information group.

According to an embodiment, the size of the sample information group may be determined according to the scan method of the current block. In addition, the current block may be determined according to the size of the determined number of sample information groups. For example, when the current block is scanned according to the horizontal scan method, the width of the sample information group may be equal to the width of the current block and the height of the sample information group may be equal to a value obtained by dividing the height of the current block by the number of sample information groups. In addition, when the current block is scanned according to the vertical scan method, the height of the sample information group may be equal to the height of the current block and the width of the sample information group may be equal to a value obtained by dividing the width of the current block by the number of sample information groups.

In step 3930, palette index information indicating colors used for the samples of the sample information group among the colors of the palette is acquired in sample information group units.

In step 3940, the sample information group is reconstructed according to the palette index information.

Figure 40:
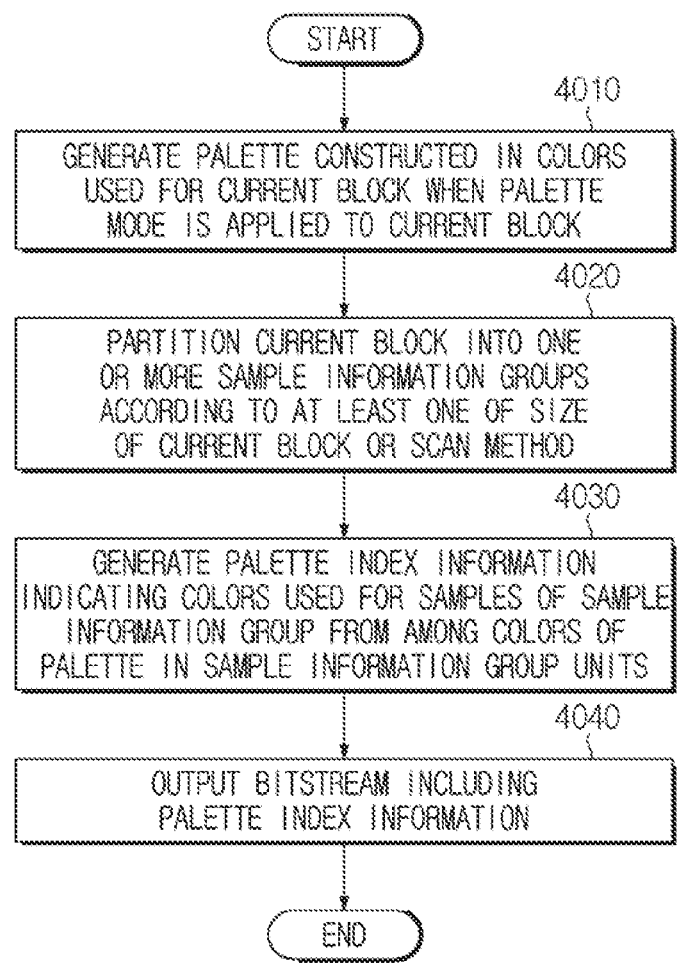
FIG. 40 is a view showing an embodiment of a video encoding method of partitioning a current block into sample information groups in a palette mode.

FIG. 40 is a view showing an embodiment of a video encoding method of partitioning a current block into sample information groups in a palette mode.

In step 4010, when the palette mode is applied to the current block, a palette constructed in colors used for the current block is generated.

In step 4020, the current block is partitioned into one or more sample information groups according to at least one of the size of the current block or the scan method.

According to an embodiment, the number of sample information groups may be determined according to the size of the current block. In addition, the current block may be partitioned such that the current block includes the determined number of sample information groups. For example, the number of sample information groups of the current block may be determined such that 16 samples are included in the sample information group.

According to an embodiment, the size of the sample information group may be determined according to the scan method of the current block. In addition, the current block may be partitioned according to the size of the determined number of sample information groups. For example, when the current block is scanned according to the horizontal scan method, the width of the sample information group may be equal to the width of the current block and the height of the sample information group may be equal to a value obtained by dividing the height of the current block by the number of sample information groups. In addition, when the current block is scanned according to the vertical scan method, the height of the sample information group may be equal to the height of the current block and the width of the sample information group may be equal to a value obtained by dividing the width of the current block by the number of sample information groups.

In step 4030, palette index information indicating colors used for the samples of the sample information group among the colors of the palette is generated in sample information group units.

In step 4040, a bitstream including the palette index information is output.

The embodiments of FIGS. 37 to 40 are merely examples and each step of FIGS. 37 to 40 may be easily modified by those skilled in the art. In addition, each configuration of FIGS. 37 to 40 may be omitted or replaced with another configuration. The video encoding method of FIGS. 37 and 39 may be performed in the decoder of FIG. 2. The video decoding method of FIGS. 40 and 41 may be performed in the encoder of FIG. 1. In addition, one or more processors may perform commands for implementing each step of FIGS. 37 to 40. A program product including the commands for implementing each step of FIGS. 37 to 40 may be stored in a memory device or distributed online.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present disclosure are applied may have a square form or a non-square form.

At least one of syntax elements (flags, indices, etc.) entropy-coded by the encoder and entropy-decoded by the decoder may use at least one of the following binarization methods.

Truncated Rice binarization method
K-th order Exp_Golomb binarization method
Restricted K-th order Exp_Golomb binarization method
Fixed-length binarization method
Unary binarization method
Truncated Unary binarization method
Truncated binary binarization method The above embodiment of the present disclosure may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present disclosure may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present disclosure are applied may be defined, and the above embodiments may be applied depending on the corresponding slice type or tile group type.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the invention, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the invention.

What is claimed is:

1. An image decoding method comprising:
   determining a prediction mode of a current block to perform prediction for the current block based on a bitstream; and
   performing decoding for the current block based on the prediction mode of the current block,
   wherein the prediction uses a palette mode,
   wherein a plurality of sample information groups are used for the current block, and
   wherein the plurality of sample information groups are determined based on a scan method for the current block.

2. The image decoding method of claim 1, wherein the plurality of the sample information groups are configured such that one sample information group comprises 16 samples.

3. The image decoding method of claim 1, wherein a palette index and a palette escape value are acquired for each sample information group of the plurality of the sample information groups.

4. The image decoding method of claim 1, wherein the prediction using the palette mode is not applied for the current block in a case that a size of the current block is 4×4.

5. The image decoding method of claim 1, wherein the prediction using the palette mode is applied for the current block only in a case that a size of the current block is greater than a specific value.

6. An image encoding method comprising:
   determining a prediction mode of a current block to perform prediction for the current block; and
   performing encoding for the current block based on the prediction mode of the current block,
   wherein the prediction uses a palette mode,
   wherein a plurality of sample information groups are used for the current block, and
   wherein the plurality of sample information groups are determined based on a scan method for the current block.

7. A non-transitory computer-readable recording medium storing a bitstream, the bitstream comprising:
   prediction mode information,
   wherein a prediction mode of a current block to perform prediction for the current block is determined based on the prediction mode information,
   wherein decoding for the current block is performed based on the prediction mode of the current block
   wherein the prediction uses a palette mode,
   wherein a plurality of sample information groups are used for the current block, and
   wherein the plurality of sample information groups are determined based on a scan method for the current block.

8. The image decoding method of claim 1, wherein the plurality of sample information groups are partitions in a horizontal direction for the current block in a case that the current block is scanned according to a horizontal scan method, and
   wherein the plurality of sample information groups are partitions in a vertical direction for the current block in a case that the current block is scanned according to a vertical scan method.

9. The image encoding method of claim 6, wherein the plurality of sample information groups are partitions in a horizontal direction for the current block in a case that the current block is scanned according to a horizontal scan method, and
   wherein the plurality of sample information groups are partitions in a vertical direction for the current block in a case that the current block is scanned according to a vertical scan method.

10. The image encoding method of claim 6, wherein the plurality of sample information groups are configured such that one sample information group comprises 16 samples.

11. The image encoding method of claim 6, wherein a palette index and a palette escape value are acquired for each sample information group of the plurality of the sample information groups.

12. The image encoding method of claim 6, wherein the prediction using the palette mode is not applied for the current block in a case that a size of the current block is 4×4.

13. The image encoding method of claim 6, wherein the prediction using the palette mode is applied for the current block only in a case that a size of the current block is greater than a specific value.

14. The non-transitory computer-readable recording medium of claim 7, wherein the plurality of sample information groups are partitions in a horizontal direction for the current block in a case that the current block is scanned according to a horizontal scan method, and
   wherein the plurality of sample information groups are partitions in a vertical direction for the current block in a case that the current block is scanned according to a vertical scan method.

15. The non-transitory computer-readable recording medium of claim 7, wherein the plurality of sample information groups are configured such that one sample information group comprises 16 samples.

16. The non-transitory computer-readable recording medium of claim 7, wherein a palette index and a palette escape value are acquired for each sample information group of the plurality of sample information groups.

17. The non-transitory computer-readable recording medium of claim 7, wherein the prediction using the palette mode is not applied for the current block in a case that a size of the current block is 4×4.

18. The non-transitory computer-readable recording medium of claim 7, wherein the prediction using the palette mode is applied for the current block only in a case that a size of the current block is greater than a specific value.

* * * * *